(12) United States Patent
Hayashi

(10) Patent No.: US 11,854,506 B2
(45) Date of Patent: Dec. 26, 2023

(54) DISPLAY DEVICE INCLUDING PIXEL HAVING FIRST AND SECOND TRANSPARENT ELECTRODES AND CORRESPONDING DRIVING METHOD

(71) Applicant: Japan Display Inc., Tokyo (JP)

(72) Inventor: Hirotaka Hayashi, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 17/486,958

(22) Filed: Sep. 28, 2021

(65) Prior Publication Data

US 2022/0013074 A1    Jan. 13, 2022

Related U.S. Application Data

(63) Continuation of application No. PCT/JP2020/009366, filed on Mar. 5, 2020.

(30) Foreign Application Priority Data

Mar. 28, 2019    (JP) .................................. 2019-063247

(51) Int. Cl.
*G09G 3/36*    (2006.01)
*G02F 1/1362*    (2006.01)
(Continued)

(52) U.S. Cl.
CPC ......... *G09G 3/3614* (2013.01); *G02F 1/1368* (2013.01); *G02F 1/13439* (2013.01);
(Continued)

(58) Field of Classification Search
CPC ............... G09G 3/3614; G09G 3/3648; G09G 2320/046; G09G 2300/0426;
(Continued)

(56) References Cited

U.S. PATENT DOCUMENTS

2006/0119756 A1* 6/2006 Shin ..................... G02F 1/13624
349/38
2006/0180813 A1* 8/2006 Kim ..................... G09G 3/3648
257/E27.111
(Continued)

FOREIGN PATENT DOCUMENTS

JP    2008-281922 A    11/2008

OTHER PUBLICATIONS

International Search Report and Written Opinion dated May 26, 2020, received for PCT Application PCT/JP2020/009366, Filed on Mar. 5, 2020, 9 pages including English Translation.
(Continued)

*Primary Examiner* — Kwang-Su Yang
(74) *Attorney, Agent, or Firm* — XSENSUS LLP

(57) ABSTRACT

According to one embodiment, a display device includes a first scanning line, a second scanning line, a signal line, a capacitive line and a pixel including a pixel electrode, a first transparent electrode connected to the capacitive line, a second transparent electrode capacitively coupled to the pixel electrode, a first switch, and a second switch. The first transparent electrode is capacitively coupled to the second transparent electrode. The first switch is electrically connected to the signal line, the pixel electrode, and the first scanning line. The second switch is electrically connected to the signal line, the second transparent electrode, and the second scanning line.

9 Claims, 22 Drawing Sheets

(51) Int. Cl.
*G02F 1/1343* (2006.01)
*G02F 1/1368* (2006.01)

(52) U.S. Cl.
CPC ..... *G02F 1/136286* (2013.01); *G09G 3/3648* (2013.01); *G09G 2300/0426* (2013.01); *G09G 2310/0202* (2013.01); *G09G 2320/046* (2013.01)

(58) Field of Classification Search
CPC ...... G09G 2310/0202; G02F 1/136286; G02F 1/1368; G02F 1/13439
See application file for complete search history.

(56) References Cited

U.S. PATENT DOCUMENTS

| | | | |
|---|---|---|---|
| 2008/0094332 A1* | 4/2008 | Tseng | G09G 3/3655 345/89 |
| 2012/0249509 A1 | 10/2012 | Kim et al. | |
| 2016/0055817 A1 | 2/2016 | Kuo | |
| 2017/0261809 A1* | 9/2017 | Mizuno | G02F 1/1334 |
| 2021/0142754 A1* | 5/2021 | Hayashi | G02F 1/136227 |

OTHER PUBLICATIONS

Office Action dated Mar. 7, 2023 in Japanese Patent Application No. 2019-063247, 3 pages. (Submitting English translation only.).

* cited by examiner

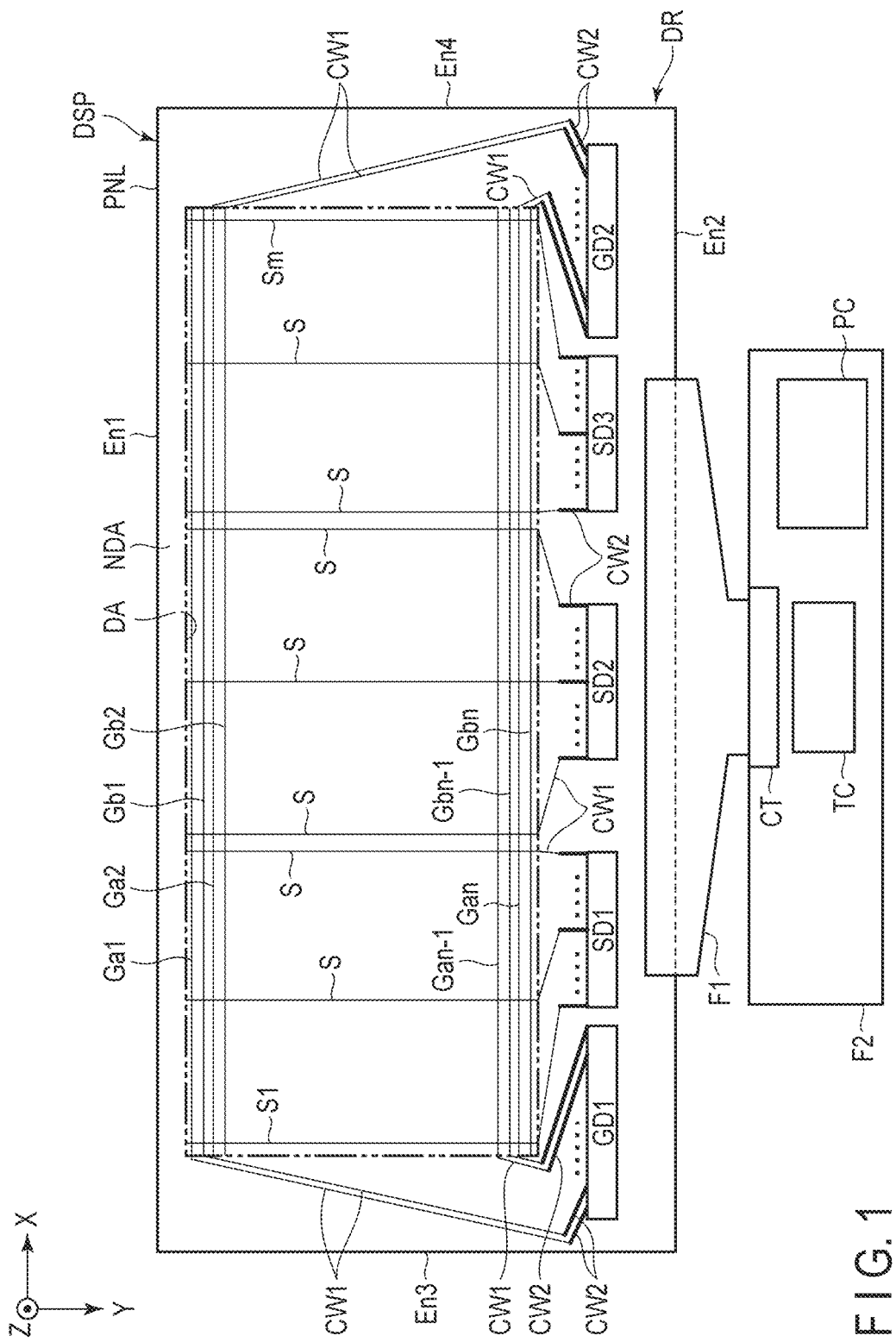
F I G. 1

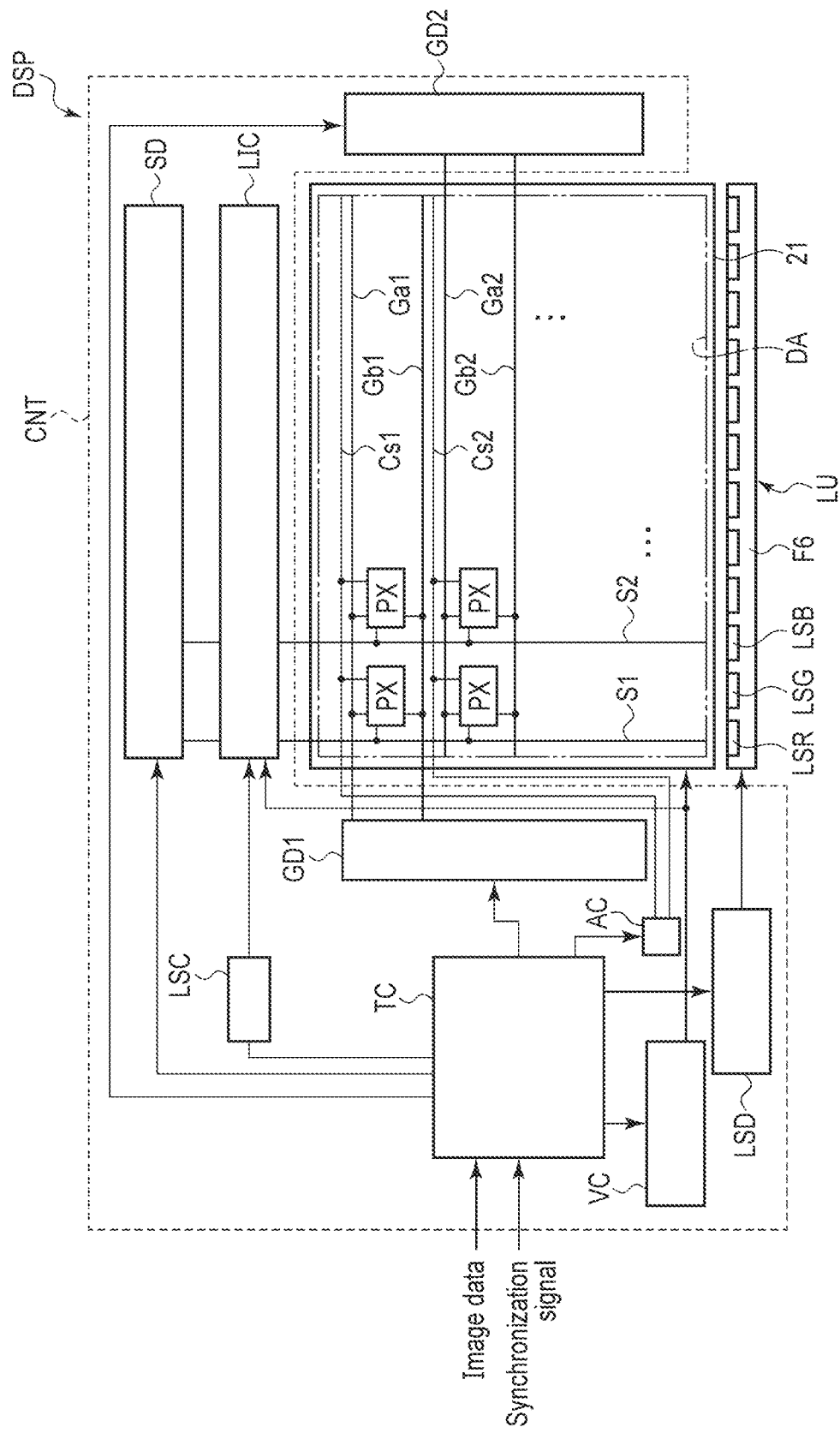
F I G. 3

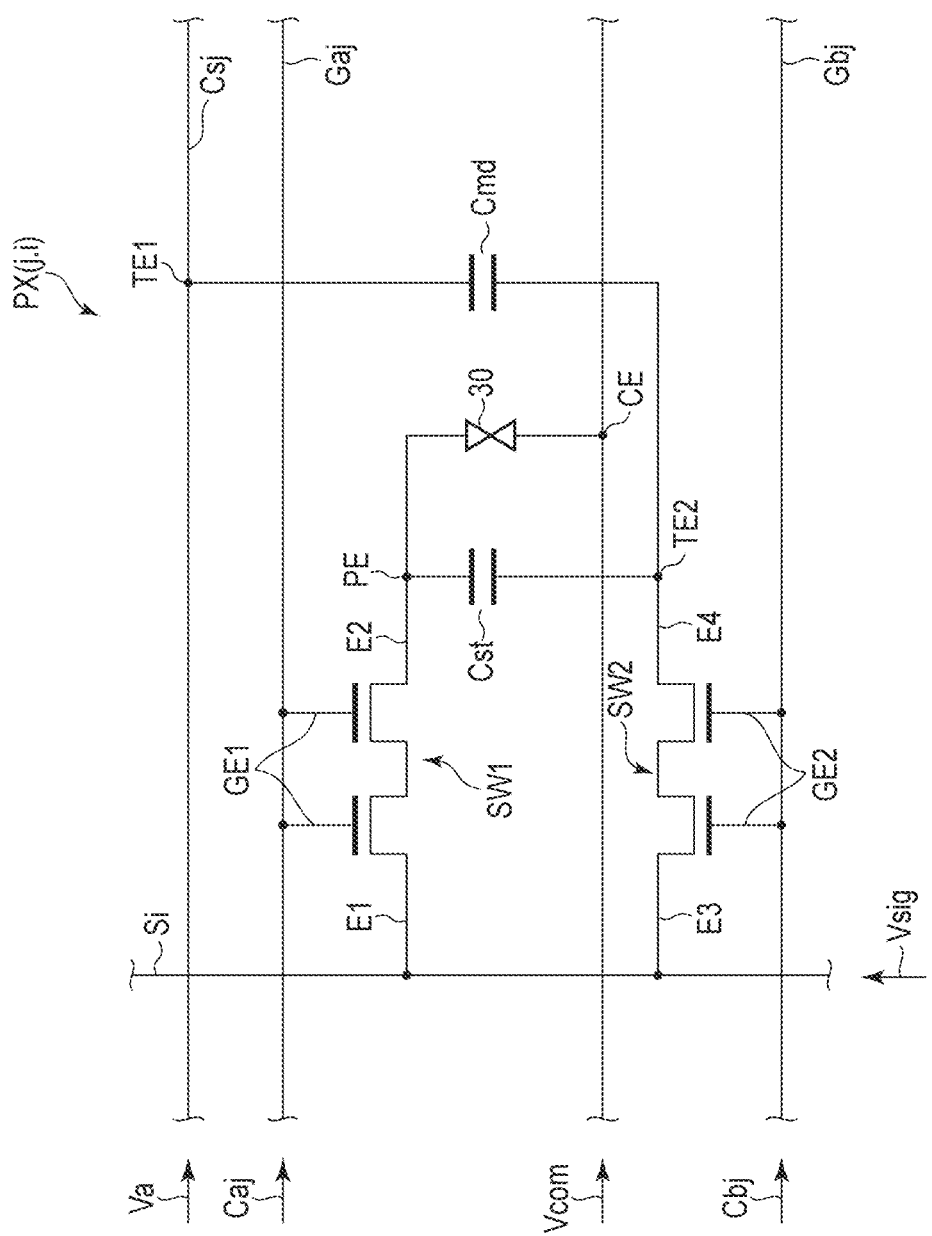
F I G. 5

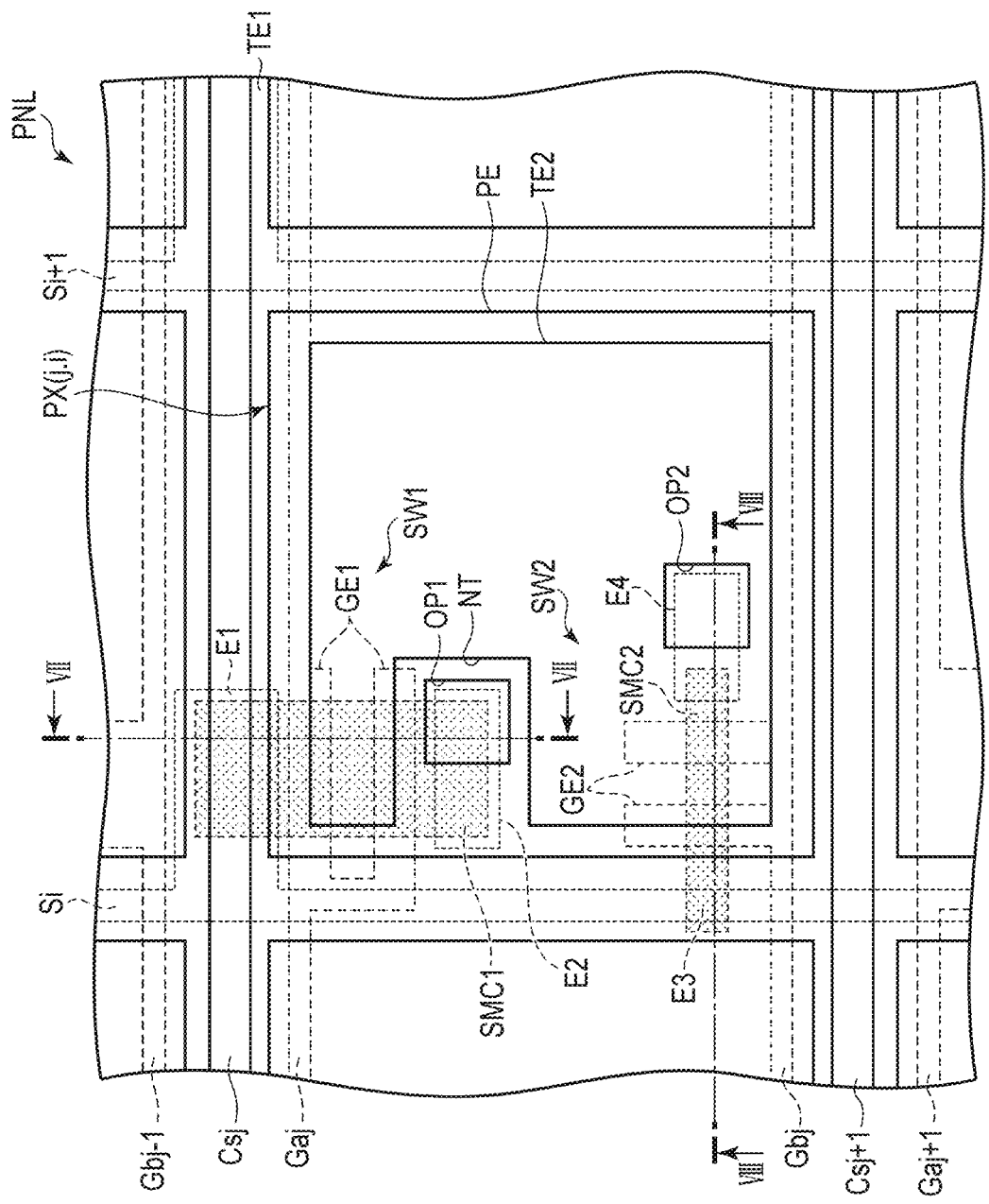
F I G. 6

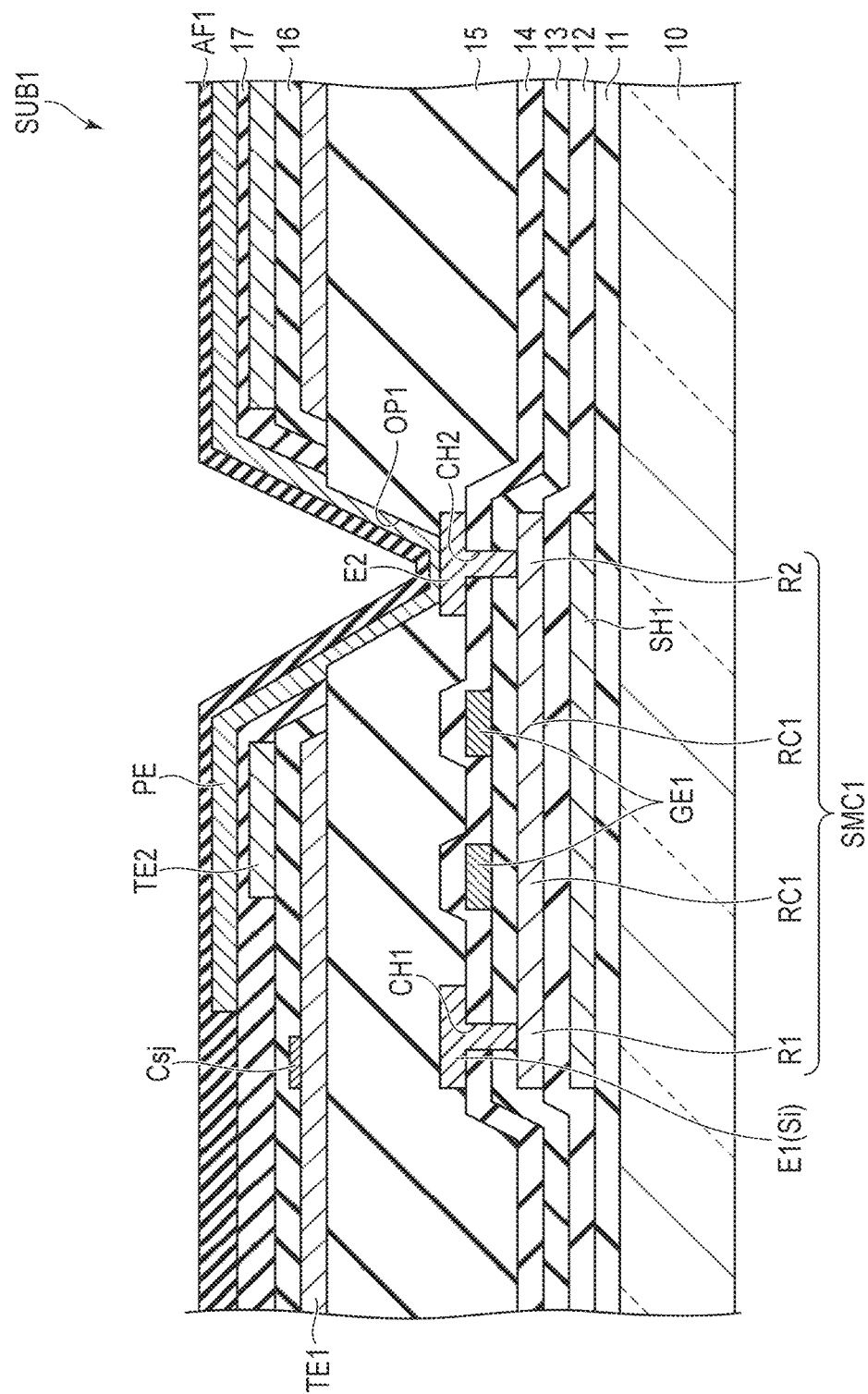
F I G. 7

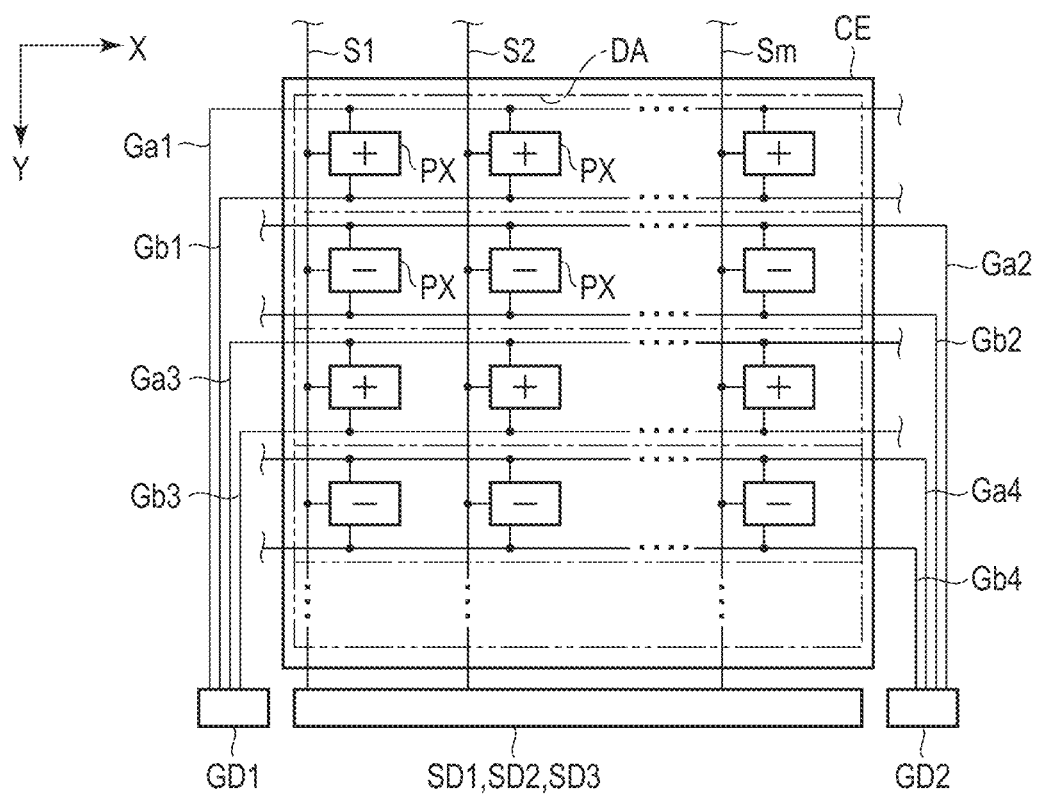
F I G. 9A

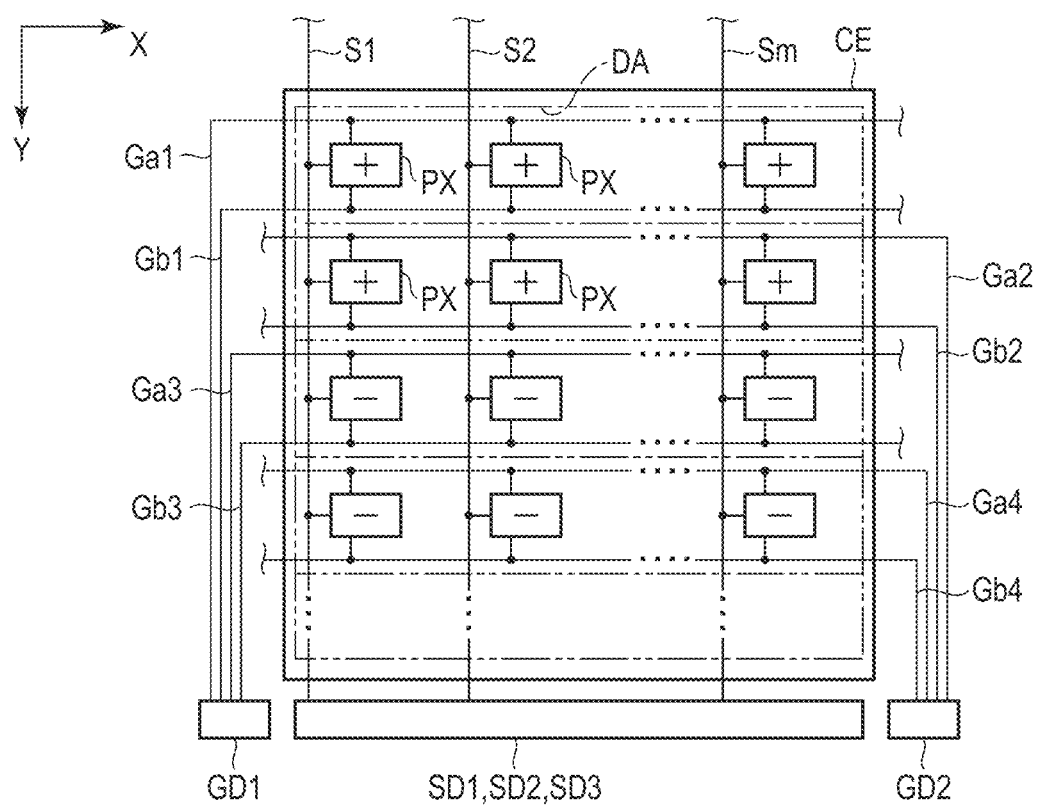
F I G. 9B

DISPLAY DEVICE INCLUDING PIXEL HAVING FIRST AND SECOND TRANSPARENT ELECTRODES AND CORRESPONDING DRIVING METHOD

CROSS-REFERENCE TO RELATED APPLICATIONS

This application is a Continuation Application of PCT Application No. PCT/JP2020/009366, filed Mar. 5, 2020 and based upon and claiming the benefit of priority from Japanese Patent Application No. 2019-063247, filed Mar. 28, 2019, the entire contents of all of which are incorporated herein by reference.

FIELD

Embodiments described herein relate to a display device and a driving method.

BACKGROUND

As a display device mounted on electronic devices such as a cellular telephone and a personal computer, liquid crystal display devices are widely used. For example, a liquid crystal display device includes an array substrate and a counter-substrate opposed to each other, a liquid crystal layer sandwiched between the substrates, a plurality of pixels arrayed in a matrix, and a drive circuit that drives the plurality of pixels.

On the array substrate, pixel electrodes are arrayed in a matrix shape so as to correspond to the pixels. On the counter-substrate, a counter-electrode is disposed so as to be opposed to the plurality of pixel electrodes. The alignment state of the liquid crystal molecules contained in the liquid crystal layer is controlled by the voltage applied to the pixel electrode and the voltage applied to the counter-electrode.

When the same voltage (DC voltage) is applied to the liquid crystal layer for a long time, the tilt of the liquid crystal layer is fixed, and as a result, a persistence phenomenon occurs, leading to a shortened life of the liquid crystal layer. In order to prevent this, in the liquid crystal display device, the voltage applied to the liquid crystal layer is alternated at certain time intervals, i.e., the voltage applied to the pixel electrode is changed to the positive voltage side and the negative voltage side at certain time intervals based on the voltage applied to the counter-electrode. In other words, a polarity inversion drive scheme is performed.

As a driving method of applying an AC voltage to the liquid crystal layer as described above, a capacity coupling (CC) drive system is known in which the voltage of an auxiliary capacitance line is controlled during a period in which a pixel switch is in a nonconductive state, and an amount of a change in a pixel electrode potential is made larger than an amount of a change in a signal potential supplied to a signal line.

BRIEF DESCRIPTION OF THE DRAWINGS

FIG. 1 is a plan view illustrating a configuration example of a display device according to an embodiment.

FIG. 3 is a diagram illustrating main components of the display device illustrated in FIG. 1.

FIG. 5 is a diagram of an equivalent circuit illustrating a pixel illustrated in FIG. 3.

FIG. 6 is a plan view illustrating the pixel illustrated in FIG. 3.

FIG. 7 is a diagram illustrating a cross section taken along line VII-VII shown in FIG. 6.

FIG. 9A is a diagram illustrating an outline of a one-line inversion drive scheme.

FIG. 9B is a diagram illustrating an outline of a two-line inversion drive scheme.

DETAILED DESCRIPTION

Figure 2:
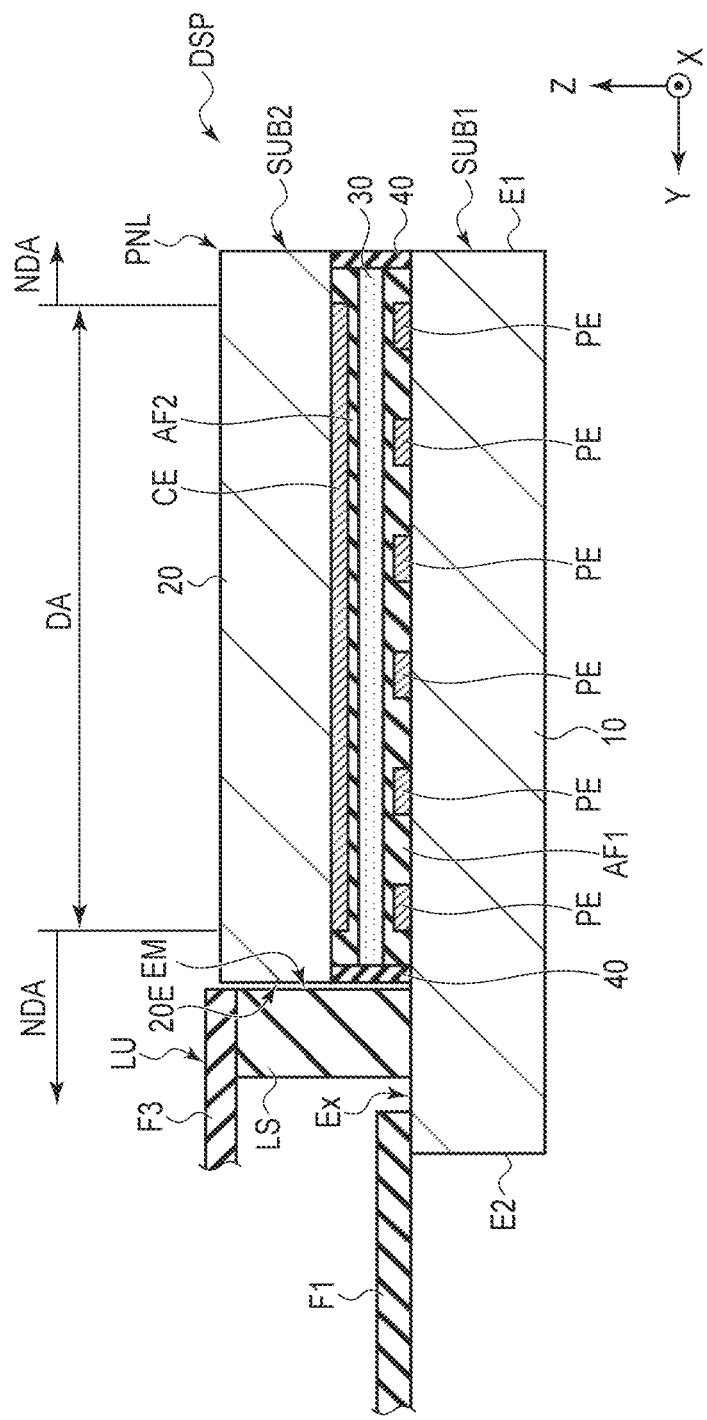
FIG. 2 is a cross-sectional view of the display device illustrated in FIG. 1.

In general, according to one embodiment, a display device includes a first scanning line, a second scanning line, a signal line, a capacitive line and a pixel including a pixel electrode, a first transparent electrode connected to the capacitive line, a second transparent electrode capacitively coupled to the pixel electrode, a first switch, and a second switch. The first transparent electrode is capacitively coupled to the second transparent electrode. The first switch is electrically connected to the signal line, the pixel electrode, and the first scanning line. The second switch is electrically connected to the signal line, the second transparent electrode, and the second scanning line.

According to one embodiment, a driving method for a display device includes steps. The display device includes a first scanning line, a second scanning line, a signal line, a capacitive line, and a pixel including a pixel electrode, a first transparent electrode connected to the capacitive line, a second transparent electrode capacitively coupled to the pixel electrode, a first switch, and a second switch, in which the first transparent electrode is capacitively coupled to the second transparent electrode, the first switch is electrically connected to the signal line, the pixel electrode, and the first scanning line, and the second switch is electrically connected to the signal line, the second transparent electrode, and the second scanning line. The steps include applying a first control signal to the first scanning line to switch turning on and off of the first switch. The steps include applying a second control signal to the second scanning line to switch on and off of the second switch. The steps include applying an image signal to the signal line. The steps include applying an auxiliary voltage to the capacitive line. The steps include turning on the first switch and turning off the second switch during a first driving period to apply the image signal to the pixel electrode through the signal line and the first switch. The steps include turning off the first switch and turning on the second switch during a second driving period following the first driving period, and applying the image signal to the second transparent electrode through the signal line and the second switch.

Embodiments will be described hereinafter with reference to the accompanying drawings.

The disclosure is merely an example, and proper changes within the spirit of the invention, which are easily conceivable by a skilled person, are included in the scope of the invention as a matter of course. In addition, in some cases, in order to make the description clearer, the structures are schematically illustrated in the drawings, compared to the actual modes. However, the schematic illustration is merely an example, and adds no restrictions to the interpretation of the invention. Besides, in the specification and drawings, the same elements as those described in connection with preceding drawings are denoted by like reference numerals, and redundant explanations may be omitted.

In the present embodiment, as an example of the display device, a liquid crystal display device to which the polymer-dispersed liquid crystal is applied will be described. The display device can be used for various devices such as digital signage, smartphones, tablet terminals and portable electronic terminals.

FIG. 1 is a plan view illustrating a configuration example of a display device DSP according to an embodiment.

In FIG. 1, a first direction X and a second direction Y are directions which intersect each other, a third direction Z is a direction which intersects the first direction X and the second direction Y. The first direction X corresponds to a column direction. The second direction Y corresponds to a row direction. For example, the first direction X, the second direction Y, and the third direction Z are orthogonal to one another but may intersect one another at an angle other than 90 degrees. In the present specification, a direction toward a pointing end of an arrow indicating the third direction Z is referred to as upward (or merely above), and a direction toward the opposite side from the pointing end of the arrow is referred to as downward (or merely below).

A display device DSP includes a display panel PNL, wiring substrates F1 and F2, and the like. The display panel PNL includes a display region DA on which an image is displayed and a frame shaped non-display region NDA surrounding the display region DA. The display panel PNL includes n first scanning lines Ga (Ga1 to Gan), n second scanning lines Gb (Gb1 to Gbn), m signal lines S (S1 to Sm), and the like. Incidentally, both n and m are positive integers, and n may be equal to m or n may be different from m. The plurality of first scanning lines Ga and the plurality of second scanning lines Gb extend in a first direction X in the display region DA, and are arranged at intervals in the first row, the second row, the third row, . . . , in a second direction Y (row direction). The plurality of signal lines S extends in the second direction Y in the display region DA, and is arranged at intervals in the first column, the second column, the third column, . . . , in the first direction X (column direction).

The display panel PNL includes a plurality of first connection lines CW1 and a plurality of second connection lines CW2. The plurality of first connection lines CW1 is provided in the non-display region NDA and electrically connected to any one of the first scanning line Ga, the second scanning line Gb, and the signal line S. In the present embodiment, the first connection line CW1 is formed of the same material as the signal line S. The plurality of second connection lines CW2 is provided in the non-display region NDA and connected to the plurality of first connection lines CW1 one-to-one. In the present embodiment, the second connection line CW2 is formed of the same material as the first scanning line Ga and the second scanning line Gb.

In addition, the present invention is not limited to this, and the plurality of first connection lines CW1 may be formed of the same material as the first scanning line Ga and the second scanning line Gb, and may be formed of the same material as a capacitive line Cs described later.

The display panel PNL has sides En1 and En2 extending in the first direction X and sides En3 and En4 extending in the second direction Y. In the present embodiment, each of the sides En1 and En2 is a long side, and each of the sides En3 and En4 is a short side.

Scanning line drive circuits GD1 and GD2 and signal line drive circuits SD1, SD2, and SD3 are mounted in the non-display region NDA of the display panel PNL. In the present embodiment, the scanning line drive circuit GD1, the signal line drive circuit SD1, the signal line drive circuit SD2, the signal line drive circuit SD3, and the scanning line drive circuit GD2 are located between the display region DA and the side En2, and are arranged in order in the first direction X. The scanning line drive circuits GD1 and GD2 and the signal line drive circuits SD1, SD2, and SD3 are electrically connected to the plurality of second connection lines CW2, respectively.

The wiring substrate F1 is connected to the display panel PNL and the wiring substrate F2. The wiring substrate F1 is electrically connected to the scanning line drive circuits GD1 and GD2 and the signal line drive circuits SD1, SD2, and SD3. The wiring substrate F2 includes a timing controller TC, a power supply circuit PC, and the like. The wiring substrate F1 is connected to the connector CT of the wiring substrate F2. Incidentally, the wiring substrates F1 and F2 may be replaced with a single wiring substrate. The scanning line drive circuits GD1 and GD2, the signal line drive circuits SD1, SD2, and SD3, and the timing controller TC described above constitute a drive unit DR of the present embodiment. The drive unit DR is configured to control driving of each of the first scanning line Ga, the second scanning line Gb, the signal line S, the capacitive line, described later, and a common electrode, described later.

In addition, the scanning line drive circuits GD1 and GD2 and the signal line drive circuits SD1, SD2, and SD3 are, for example, driver ICs, and the scanning line drive circuits GD1 and GD2 and the signal line drive circuits SD1, SD2, and SD3 of the driver ICs are not limited to the example that the scanning line drive circuits GD1 and GD2 and the signal line drive circuits SD1, SD2, and SD3 are mounted on the display panel PNL, and may have a structure in which the scanning line drive circuits GD1 and GD2 and the signal line drive circuits SD1, SD2, and SD3 are mounted on the wiring substrate F1 or the wiring substrate F2.

In the illustrated example, the odd-numbered first scanning lines Ga1, . . . , Ga(n−1) and the odd-numbered second scanning lines Gb1, . . . , Gb(n−1) are connected to the scanning line drive circuit GD1 from the side En1 side, and the even-numbered first scanning lines Ga2, . . . , Gan and the even-numbered second scanning lines Gb2, . . . , Gbn are connected to the scanning line drive circuit GD2. However, the connection relationship of the first scanning line Ga and the second scanning line Gb with the scanning line drive circuits GD1 and GD2 is not limited to the illustrated example. For example, the scanning line drive circuits GD1 and GD2 may be replaced with a single scanning line drive circuit, and all the first scanning lines Ga and all the second scanning lines Gb may be connected to the single scanning line drive circuit. The connection relationship of the signal line S with the signal line drive circuits SD1, SD2, and SD3 is not limited to the illustrated example. The signal line drive circuits SD1, SD2, and SD3 may be replaced with a single signal line drive circuit, and all the signal lines S may be connected to a single signal line drive circuit.

FIG. 2 is a cross-sectional view of the display device DSP illustrated in FIG. 1. Here, only the main part will be described in the cross section of the display device DSP on the Y-Z plane defined by the second direction Y and the third direction Z.

As illustrated in FIG. 2, the display panel PNL includes a first substrate SUB1, a second substrate SUB2, a liquid crystal layer 30 as a display function layer, and the like. The first substrate SUB1 includes a transparent substrate 10, a pixel electrode PE, an alignment film AF1, and the like. The second substrate SUB2 includes a transparent substrate 20, a common electrode CE, an alignment film AF2, and the like. The pixel electrode PE and the common electrode CE are made of a transparent conductive material such as indium tin oxide (ITO) or indium zinc oxide (IZO).

The liquid crystal layer 30 is located at least in the display region DA. The liquid crystal layer 30 includes a polymer dispersed liquid crystal and is located between the alignment film AF1 and the alignment film AF2. The liquid crystal layer 30 of the present embodiment uses reverse mode polymer dispersed liquid crystal (R-PDLC). The liquid crystal layer 30 maintains the parallelism of the incident light when the applied voltage is low, and scatters the incident light when the applied voltage is high. The first substrate SUB1 is joined to the second substrate SUB2 with a sealing material 40. The first substrate SUB1 has an extending portion EX extending in the second direction Y from an end portion 20E of the transparent substrate 20.

The wiring substrate F1 is mounted on the extending portion EX of the first substrate SUB1, and physically fixed to the extending portion EX. The extending portion EX is a portion of the first substrate SUB1 exposed (not overlapped) from the second substrate SUB2. In addition, the wiring substrate F1 is electrically connected to a pad, not illustrated, of the extending portion EX. Incidentally, the pad is electrically connected to the scanning line drive circuits GD1 and GD2 and the signal line drive circuits SD1, SD2, and SD3.

A light source unit LU is located in the non-display region NDA outside the display region DA. The light source unit LU includes a light emitting element LS, a wiring substrate F3, and the like. The light emitting element LS is connected to the wiring substrate F3 and located on the extending portion EX. The light emitting element LS includes a light-emitting unit (light-emitting surface) EM opposed to the end portion 20E. The illumination light emitted from the light-emitting unit EM enters the end portion 20E and propagates through the display panel PNL.

FIG. 3 is a diagram illustrating main components of the display device DSP illustrated in FIG. 1.

As illustrated in FIG. 3, the display device DSP includes a controller CNT indicated by a broken line in the drawing. The controller CNT includes the timing controller TC, the scanning line driving circuits GD1 and GD2, the signal line drive circuits SD1, SD2, and SD3, a Vcom circuit VC, an auxiliary circuit AC, a level conversion circuit (L/S circuit) LSC, a Vcom pull-in circuit LIC, a light source driver LSD, and the like. Incidentally, the level conversion circuit LSC and the Vcom pull-in circuit LIC will be described later together with FIG. 4, and the detailed description will be omitted here.

The timing controller TC generates various signals based on image data, a synchronization signal, and the like input from the outside. In one example, the timing controller TC outputs an image signal (e.g., a video signal) generated by performing predetermined signal processing based on the image data to the signal line drive circuits SD1, SD2, and SD3. In addition, the timing controller TC outputs a control signal generated based on the synchronization signal to each of the scanning line drive circuits GD1 and GD2, the signal line drive circuits SD1, SD2, and SD3, the Vcom circuit VC, the auxiliary circuit AC, the level conversion circuit LSC, and the light source driver LSD. The details of the timing controller TC will be described later.

The display region DA indicated by a chain doubledashed line in the drawing includes a plurality of pixels PX. The plurality of pixels PX is provided in a matrix in the first direction X and the second direction Y. The pixels PX are each electrically connected to the first scanning line Ga, the second scanning line Gb, the signal line S, and the capacitive line Cs. Incidentally, the n capacitive lines Cs (Cs1 to Csn) extend in the first direction X and are arranged at intervals in the second direction Y in the display region DA.

The common electrode CE is located in the display region DA. The common electrode CE is shared by the plurality of pixels PX. The common electrode CE constitutes a part of the pixel PX. To each of the first scanning lines Ga, a first control signal is applied from the scanning line drive circuit GD1 or GD2. To each of the second scanning lines Gb, a second control signal is applied from the scanning line drive circuit GD1 or GD2. To each of the signal lines S, an image signal (video signal) is applied from the signal line drive circuit SD1, SD2, or SD3. To the common electrode CE, a common voltage Vcom is supplied from the Vcom circuit VC. To the capacitive line Cs, an auxiliary voltage Va (e.g., the same voltage as the common voltage Vcom) is applied from the auxiliary circuit AC.

In the present embodiment, the plurality of signal lines S is connected to the signal line drive circuit SD without passing through the selector circuit. For this reason, the signal line drive circuit SD can simultaneously apply the image signal to all the signal lines S. However, unlike the present embodiment, the plurality of signal lines S may be connected to the signal line drive circuit SD through a selector circuit. In this case, the plurality of signal lines S is driven in a time-sharing manner, and image signals are applied to the plurality of signal lines S in a time-sharing manner.

In addition, the scanning line drive circuits GD1 and GD2 are not limited to the examples of the driver IC, and may be a gate built-in circuit formed on the first substrate SUB1, and the selector circuit connected to the signal line drive circuit SD may also be a built-in circuit formed on the first substrate SUB1.

The light source unit LU is configured to irradiate the liquid crystal layer 30 with light of a color other than achromatic colors. The light source unit LU includes light emitting elements LS of a plurality of colors. For example, the light source unit LU includes a light emitting element (first light emitting element) LSR that irradiates the liquid crystal layer 30 with light of a first color, a light emitting element (second light emitting element) LSG that irradiates the liquid crystal layer 30 with light of a second color, and a light emitting element (third light emitting element) LSB that irradiates the liquid crystal layer 30 with light of a third color. It is without saying that the first color, the second color, and the third color are different from each other. In the present embodiment, the first color is red, the second color is green, and the third color is blue. The light source driver LSD controls the lighting periods of the light emitting elements LSR, LSG, and LSB. As will be described in detail later, in the drive system in which one frame period has a plurality of subframe periods, at least one of the three light emitting elements LSR, LSG, and LSB is turned on in each subframe, and the color of the illumination light is switched for each subframe.

In addition, the light source unit LU is not limited to the light source unit for color display including the light emitting elements LS of the first color, the second color, and the third color as described above, and may include only a white light emitting element and may be used for monochrome display.

Here, the level conversion circuit LSC and the Vcom pull-in circuit LIC illustrated in FIG. 3 will be described with reference to FIG. 4.

The common voltage Vcom supplied from the Vcom circuit VC is supplied to the common electrode CE and also supplied to the Vcom pull-in circuit LIC. The Vcom pull-in circuit LIC is interposed between the signal line drive circuit SD and the signal lines S. The Vcom pull-in circuit LIC supplies the image signal output from the signal line drive circuit SD to the signal lines S. In addition, the Vcom pull-in circuit LIC supplies the common voltage Vcom from the Vcom circuit VC to the signal lines S.

Figure 4:
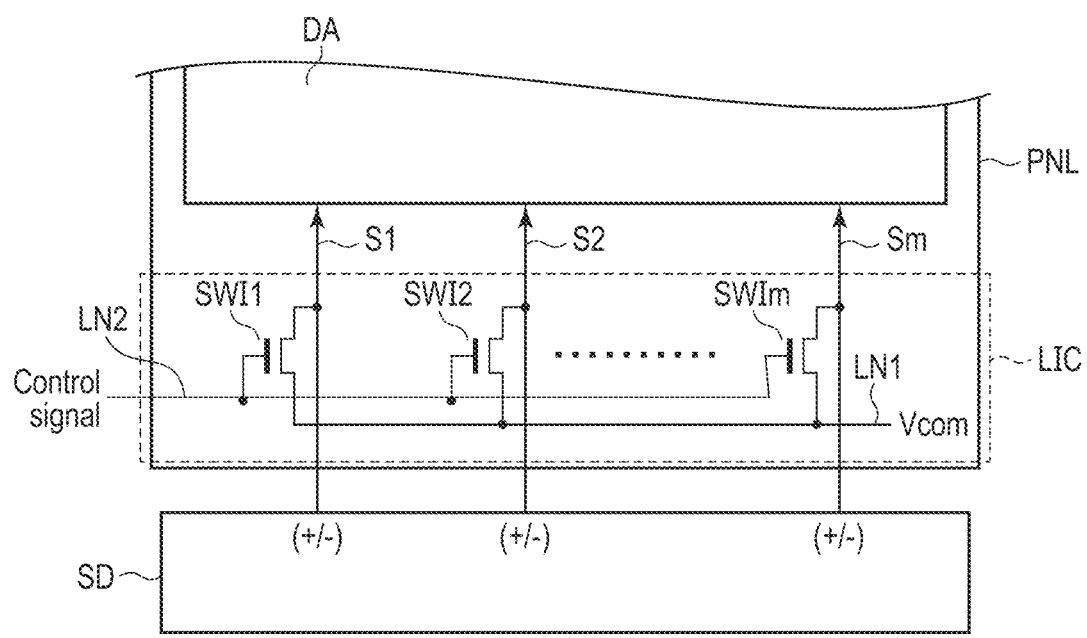
FIG. 4 is a diagram that describes a level conversion circuit and a Vcom pull-in circuit illustrated in FIG. 3.

As illustrated in FIG. 4, the Vcom pull-in circuit LIC includes switching elements SWI1 to SWIm. For example, the switching elements SWI1 to SWIm are disposed on the first substrate SUB1 of the display panel PNL. To the input ends (sources) of the switching elements SWI1 to SWIm, a line LN1 is connected. To the output ends (drains), the signal lines S1 to Sm are individually connected. To the control ends (gates), a line LN2 is connected.

The Vcom circuit VC supplies the common voltage Vcom to the line LN1. This operation is performed in a vertical blanking period described later. When the Vcom pull-in circuit LIC supplies the common voltage Vcom to the signal lines S1 to Sm, the output of the signal line drive circuit SD is controlled to high impedance. The timing controller TC outputs a control signal to the level conversion circuit LSC when executing the above operation. The level conversion circuit LSC converts the control signal into a voltage of a predetermined level and supplies the voltage to the line LN2.

When the control signal is supplied to the line LN2, the line LN1 and the signal lines S1 to Sm are conducted, and the common voltage Vcom of the line LN1 is supplied to the signal lines S1 to Sm.

Incidentally, although FIGS. 3 and 4 illustrate the case in which the controller CNT includes the level conversion circuit LSC and the Vcom pull-in circuit LIC, the present invention is not limited to this. Instead of the level conversion circuit LSC and the Vcom pull-in circuit LIC, a circuit capable of supplying the common voltage Vcom to the signal line S may be separately provided in the signal line drive circuit SD.

Next, one pixel PX (j, i) positioned in the jth row and the ith column will be described as a representative of the above-described plurality of pixels PX. Incidentally, the plurality of pixels PX is similarly configured. FIG. 5 is a diagram of an equivalent circuit illustrating the pixel PX illustrated in FIG. 3.

As illustrated in FIG. 5, the pixel PX includes the pixel electrode PE, a first transparent electrode TE1, a second transparent electrode TE2, a first switch SW1, a second switch SW2, and the common electrode CE.

To the common electrode CE, the common voltage Vcom is applied from the drive unit DR. To the liquid crystal layer 30, a voltage applied across the pixel electrode PE and the common electrode CE is applied. The second transparent electrode TE2 is capacitively coupled to the pixel electrode PE. In other words, the second transparent electrode TE2 and the pixel electrode PE form a capacitor Cst. The first transparent electrode TE1 is electrically connected to the capacitive line Csj and capacitively coupled to the second transparent electrode TE2. In other words, the first transparent electrode TE1 and the second transparent electrode TE2 form a capacitor Cmd.

Incidentally, two or more pixel electrodes PE are not electrically connected to each other. Similarly, two or more first transparent electrodes TE1 are not electrically connected to each other, and two or more second transparent electrodes TE2 are not electrically connected to each other. This is because when the pixels PX are different, the potential of the pixel electrode PE may be different, the potential of the first transparent electrode TE1 may be different, or the potential of the second transparent electrode TE2 may be different.

The first switch SW1 and the second switch SW2 are formed of a switching element such as a thin film transistor (TFT). In the present embodiment, the first switch SW1 and the second switch SW2 are N-channel and double-gate TFTs.

The first switch SW1 includes a first gate electrode GE1, a first electrode E1, and a second electrode E2. The first gate electrode GE1 is electrically connected to the first scanning line Gaj. The first electrode E1 is connected to the signal line Si. The second electrode E2 is electrically connected to the pixel electrode PE. The turning on and off of the first switch SW1 is switched based on the first control signal Caj applied through the first scanning line Gaj. When the drive unit DR outputs an image signal Vsig to the signal line Si in a state in which the first switch SW1 is turned on, i.e., in a state in which the TFT constituting the first switch SW1 is switched to the conductive state, the image signal Vsig is applied to the pixel electrode PE through the signal line Si and the first switch SW1.

The second switch SW2 includes a second gate electrode GE2, a third electrode E3, and a fourth electrode E4. The second gate electrode GE2 is electrically connected to the second scanning line Gbj. The third electrode E3 is connected to the signal line Si. The fourth electrode E4 is electrically connected to the second transparent electrode TE2. The turning on and off of the second switch SW2 is switched based on the second control signal Cbj applied through the second scanning line Gbj. When the drive unit DR outputs the image signal Vsig to the signal line Si in a state in which the second switch SW2 is turned on, i.e., in a state in which the TFT constituting the second switch SW2 is switched to the conductive state, the image signal Vsig is applied to the second transparent electrode TE2 through the signal line Si and the second switch SW2.

The plurality of pixels PX in each row arranged in the second direction Y is commonly connected to one corresponding first scanning line Ga, one corresponding second scanning line Gb, and one corresponding capacitive line Cs among the plurality of first scanning lines Ga, the plurality of second scanning lines Gb, and the plurality of capacitive lines Cs. For example, the plurality of pixels PX in the jth row is commonly connected to the first scanning line Gaj, the second scanning line Gbj, and the capacitive line Csj.

The plurality of pixels PX in each column arranged in the first direction X is commonly connected to one corresponding signal line S among the plurality of signal lines S. For example, the plurality of pixels PX in the ith column is commonly connected to the signal line Si.

FIG. 6 is a plan view illustrating a part of the display panel PNL of the display device DSP, and is a view illustrating the pixel PX. Incidentally, in FIG. 6, the illustration of light-shielding layers SH1 and SH2, described later, is omitted.

As illustrated in FIG. 6, the capacitive line Csj is located closer to the first scanning line Gaj from the second scanning line Gbj in a planar view, and located at a distance from the second transparent electrode TE2. In the second direction Y, the first scanning line Gaj is located between the capacitive line Csj and the second scanning line Gbj. In the present embodiment, the second scanning line Gbj−1, the capacitive line Csj, and the first scanning line Gaj are provided at intervals in the second direction Y. In addition, the second scanning line Gbj, the capacitive line Csj+1, and the first scanning line Gaj+1 are provided at intervals in the second direction Y.

In a planar view, the first switch SW1 and the second switch SW2 are substantially located between the first scanning line Gaj and the second scanning line Gbj, and substantially located between the signal line Si and the signal line Si+1. From the description above, the first switch SW1 and the second switch SW2 are substantially located in a region surrounded by the first scanning line Gaj, the second scanning line Gbj, the signal line Si, and the signal line Si+1. The region surrounded by the first scanning line Gaj, the second scanning line Gbj, the signal line Si, and the signal line Si11 is a region surrounded by four sides by a virtual center line passing through the center of the line width of each of the first scanning line Gaj, the second scanning line Gbj, the signal line Si, and the signal line Si+1 in the present embodiment. The pixel electrode PE, the first transparent electrode TE1, and the second transparent electrode TE2 are opposed to the first switch SW1 and the second switch SW2 in a planar view.

The pixel electrode PE has a rectangular shape and is located in a region surrounded by the capacitive line Csj, the capacitive line Csj+1, the signal line Si, and the signal line Si11. The region surrounded by the capacitive line Csj, the capacitive line Csj+1, the signal line Si, and the signal line Si11 is a region surrounded by four sides by a virtual center line passing through the center of the line width of each of the capacitive line Csj, the capacitive line Csj+1, the signal line Si, and the signal line Si11 in the present embodiment. In the present embodiment, the pixel electrode PE overlaps the first scanning line Gaj and the second scanning line Gbj, and does not overlap the capacitive line Csj, the capacitive line Csj+1, the signal line Si, and the signal line Si+1.

The second transparent electrode TE2 is smaller than the pixel electrode PE, and the entire surface of the second transparent electrode TE2 overlaps the pixel electrode PE. In other words, the second transparent electrode TE2 is located in a region further inside the pixel electrode PE located in the region surrounded by the capacitive line Csj, the capacitive line Csj+1, the signal line Si, and the signal line Si+1. In the present embodiment, the second transparent electrode TE2 has a notch portion NT (notch) at a position opposed to the second electrode E2.

The first transparent electrode TE1 is provided over the entire surface of the display panel PNL. The first transparent electrode TE1 has a first opening OP1 and a second opening OP2. The first opening OP1 is used for bringing the pixel electrode PE into contact with the first switch SW1. The pixel electrode PE passes through the first opening OP1 of the first transparent electrode TE1, and is in contact with the second electrode E2 of the first switch SW1. The second opening OP2 is used for bringing the second transparent electrode TE2 into contact with the second switch SW2. The second transparent electrode TE2 passes through the second opening OP2 of the first transparent electrode TE1 and is in contact with the fourth electrode E4 of the second switch SW2.

In the first switch SW1, for example, the first electrode E1 extends in the first direction X and is formed integrally with the signal line Si extending in the second direction Y. The second electrode E2 extends, for example, in the first direction X, is opposed to the notch portion NT, and is connected to the pixel electrode PE. Each of the first gate electrodes GE1 extends in the first direction X, is located between the first electrode E1 and the second electrode E2, and is formed integrally with the first scanning line Gaj extending in the first direction X.

A first semiconductor layer SMC1 of the first switch SW1 is opposed to each of the first electrode E1, the first gate electrode GE1, and the second electrode E2, and continuously extends in the second direction Y.

In the second switch SW2, for example, the third electrode E3 extends in the second direction Y and is formed integrally with the signal line Si extending in the second direction Y. The fourth electrode E4 extends, for example, in the first direction X and is connected to the second transparent electrode TE2. Each of the second gate electrodes GE2 extends in the second direction Y, is located between the third electrode E3 and the fourth electrode E4, and is formed integrally with the second scanning line Gbj extending in the first direction X.

A second semiconductor layer SMC2 of the second switch SW2 is opposed to each of the third electrode E3, the second gate electrode GE2, and the fourth electrode E4, and continuously extends in the first direction X.

The first electrode E1 to the fourth electrode E4 and the signal line S described above are formed of the same light-blocking metal material. For example, each of the first electrode E1 to the fourth electrode E4 and the signal line S adopts a three-layer stacked structure (Ti-based/Al-based/Ti-based), and includes a lower layer made of a metal material containing Ti as a main component, such as Ti (titanium) and an alloy containing Ti, an intermediate layer made of a metal material containing Al as a main component, such as Al (aluminum) and an alloy containing Al, and an upper layer made of a metal material containing Ti as a main component, such as Ti and an alloy containing Ti.

The first gate electrode GE1 and the second gate electrode GE2, and the first scanning line Ga and the second scanning line Gb are formed of the same light-blocking metal material. For example, the first gate electrode GE1 and the second gate electrode GE2, and the first scanning line Ga and the second scanning line Gb are formed of a metal material such as Al, Ti, silver (Ag), molybdenum (Mo), tungsten (W), copper (Cu), or chromium (Cr), an alloy in combination of these metal materials, or the like, and may have a single-layer structure or a multilayer structure. In the present embodiment, the first gate electrode GE1 and the second gate electrode GE2, and the first scanning line Ga and the second scanning line Gb are formed of Mo.

The capacitive line Cs is made of a light-shielding metal material. For example, the capacitive line Cs adopts a three-layer stacked structure (Mo-based/Al-based/Mo-based), and includes a lower layer made of a metal material containing Mo as a main component, such as Mo and an alloy containing Mo, an intermediate layer made of a metal material containing Al as a main component, such as Al and an alloy containing Al, and an upper layer made of a metal material containing Mo as a main component, such as Mo and an alloy containing Mo.

The second transparent electrode TE2 functions as a common node of the second switch SW2, the capacitor Cst, and the capacitor Cmd. For this reason, the area efficiency of the second switch SW2 in the pixel PX can be increased as compared with the case in which the second transparent electrode TE2 does not function as the node. For example, the number of lines connecting the fourth electrode E4 and the second transparent electrode TE2 can be reduced, and the opening area of the pixel PX can be increased.

Next, a cross-sectional structure of the display panel PNL will be described. FIG. 7 is a cross-sectional view illustrating the display panel PNL of FIG. 6 taken along line VII-VII. Incidentally, in FIG. 7, for convenience of description, only the cross section on the first substrate SUB1 side is illustrated, and the cross sections on the liquid crystal layer 30 side and the second substrate SUB2 side are omitted.

As illustrated in FIG. 7, the first substrate SUB1 includes the transparent substrate 10, insulating layers 11 to 17, the light-shielding layer SH1, the first semiconductor layer SMC1, the signal line Si (first electrode E1), the first gate electrode GE1, the second electrode E2, the first transparent electrode TE1, the capacitive line Csj, the second transparent electrode TE2, the pixel electrode PE, the alignment film AF1, and the like.

The transparent substrate 10 can use a glass substrate as a transparent substrate having insulating properties. However, a substrate other than a glass substrate may be used for the transparent substrate 10. For example, the transparent substrate 10 may be a resin substrate.

On the transparent substrate 10, the insulating layers 11 to 17 are sequentially disposed. The insulating layers 11 to 14, 16, and 17 are formed of an inorganic insulating layer such as silicon oxide or silicon nitride, or a multilayer stack of these layers. The insulating layer 15 is formed of an organic insulating layer.

The light-shielding layer SH1 is located on the insulating layer 11 and covered with the insulating layer 12. Although is formed of a metal material, the light-shielding layer SH1 may be formed of a light-shielding material such as a black resin.

The first semiconductor layer SMC1 is located on the insulating layer 12 and covered with the insulating layer 13. The first gate electrode GE1 is located on the insulating layer 13 and covered with the insulating layer 14. The first semiconductor layer SMC1 includes two first channel regions RC1, a first low resistance region R1, and a second low resistance region R2. The first channel region RC1 is located between the first low resistance region R1 and the second low resistance region R2. Each of the first channel regions RC1 is opposed to the first gate electrode GE1.

The first low resistance region R1 is electrically connected to the signal line Si (first electrode E1) and has a lower resistance than the first channel region RC1. Incidentally, the signal line Si (first electrode E1) penetrates the insulating layer 13 and the insulating layer 14, passes through one or more contact holes CH1 located in a region opposed to the first low resistance region R1, and is electrically connected to the first low resistance region R1.

The second low resistance region R2 is electrically connected to the second electrode E2 and has a lower resistance than the first channel region RC1. Incidentally, the second electrode E2 penetrates the insulating layer 13 and the insulating layer 14, passes through one or more contact holes CH2 located in a region opposed to the second low resistance region R2, and is electrically connected to the second low resistance region R2.

The light-shielding layer SH1 is opposed to the first switch SW1. The light-shielding layer SH1 is opposed to at least the entire first channel region RC1 in the first semiconductor layer SMC1.

The signal line Si (first electrode E1) and the second electrode E2 are located on the insulating layer 14 and covered with the insulating layer 15. The first transparent electrode TE1 is located on the insulating layer 15 and covered with the insulating layer 16. The first transparent electrode TE1 is not formed in a region opposed to the second electrode E2, and the first opening OP1 (contact hole) is formed in the region. On the first transparent electrode TE1, a capacitive line CSj is formed, and the capacitive line CSj is covered with the insulating layer 16. The capacitive line Csj is formed in a region opposed to the signal line Si (first electrode E1).

The second transparent electrode TE2 is located on the insulating layer 16 and covered with the insulating layer 17. The pixel electrode PE is located on the insulating layer 17 and electrically connected to the second electrode E2 through the first opening OP1. In other words, the pixel electrode PE is also electrically connected to the second low resistance region R2 described above through the second electrode E2. The pixel electrode PE is covered with the alignment film AF1. The second transparent electrode TE2, the insulating layer 17, and the pixel electrode PE form the capacitor Cst. The size of the capacitance of the capacitor Cst is set according to the film thickness of the insulating layer 17.

The first transparent electrode TE1, the second transparent electrode TE2, and the pixel electrode PE are formed of an optically transparent conductive material such as ITO. For this reason, it is possible to form the first substrate SUB1 by a manufacturing method similar to that of a liquid crystal display panel in a fringe field switching (FFS) mode which is a type of an in-plane switching (IPS) mode.

Figure 8:
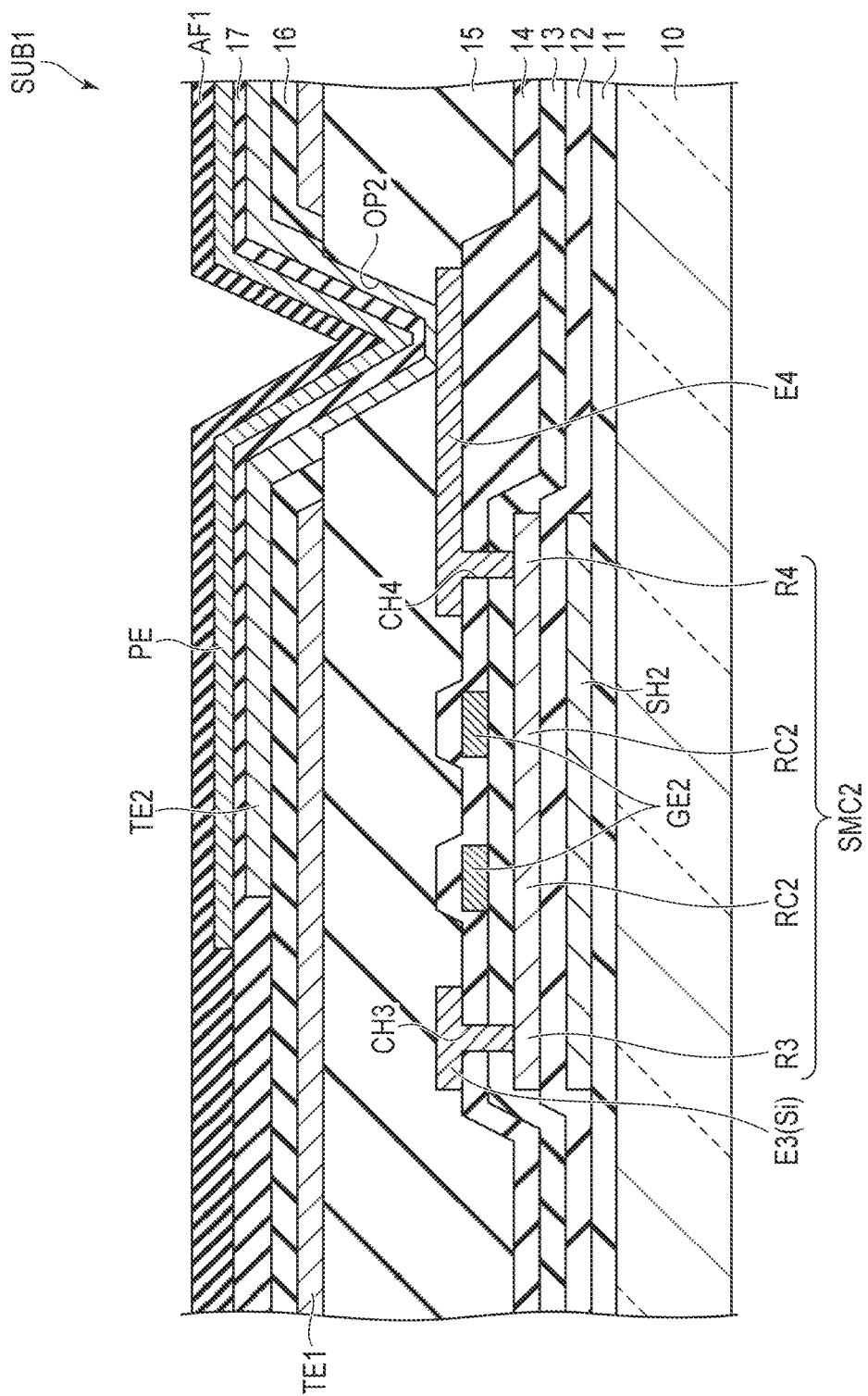
FIG. 8 is a diagram illustrating a cross section taken along line VIII-VIII shown in FIG. 6.

FIG. 8 is a cross-sectional view illustrating the display panel PNL of FIG. 5 taken along line VIII-VIII.

As illustrated in FIG. 8, the first substrate SUB1 includes the transparent substrate 10, the insulating layers 11 to 17, the light-shielding layer SH2, the second semiconductor layer SMC2, the signal line Si (third electrode E3), the second gate electrode GE2, the fourth electrode E4, the first transparent electrode TE1, the second transparent electrode TE2, the pixel electrode PE, the alignment film AF1, and the like.

The light-shielding layer SH2 is located on the insulating layer 11 and covered with the insulating layer 12. Although the light-shielding layer SH2 is formed of a metal material, the light-shielding layer SH2 may be formed of a light-shielding material such as a black resin.

The second semiconductor layer SMC2 is located on the insulating layer 12 and covered with the insulating layer 13. The second gate electrode GE2 is located on the insulating layer 13 and covered with the insulating layer 14. The second semiconductor layer SMC2 includes two second channel regions RC2, a third low resistance region R3, and a fourth low resistance region R4. The second channel region RC2 is located between the third low resistance region R3 and the fourth low resistance region R4. Each of the second channel regions RC2 is opposed to the second gate electrode GE2.

The third low resistance region R3 is electrically connected to the signal line Si (third electrode E3) and has a lower resistance than the second channel region RC2. Incidentally, the signal line Si (third electrode E3) penetrates the insulating layer 13 and the insulating layer 14, passes through one or more contact holes CH3 located in a region opposed to the third low resistance region R3, and is electrically connected to the third low resistance region R3.

The fourth low resistance region R4 is electrically connected to the fourth electrode E4 and has a lower resistance than the second channel region RC2. Incidentally, the fourth electrode E4 penetrates the insulating layer 13 and the insulating layer 14, passes through one or more contact holes CH4 located in a region opposed to the fourth low resistance region R4, and is electrically connected to the fourth low resistance region R4.

The light-shielding layer SH2 is opposed to the second switch SW2. The light-shielding layer SH2 is opposed to at least the entire second channel region RC2 in the second semiconductor layer SMC2.

The signal line Si (third electrode E3) and the fourth electrode E4 are located on the insulating layer 14 and covered with the insulating layer 15. The first transparent electrode TE1 is located on the insulating layer 15 and covered with the insulating layer 16. The first transparent electrode TE1 is not formed in a region opposed to the fourth electrode E4, and the second opening OP2 (contact hole) is formed in the region.

The second transparent electrode TE2 is located on the insulating layer 16 and electrically connected to the fourth electrode E4 through the second opening OP2. In other words, the second transparent electrode TE2 is also electrically connected to the fourth low resistance region R4 described above through the fourth electrode E4. The pixel electrode PE is located on the insulating layer 17 and covered with the alignment film AF1. The first transparent electrode TE1, the insulating layer 16, and the second transparent electrode TE2 form the capacitor Cmd. The size of the capacitance of the capacitor Cmd is set according to the film thickness of the insulating layer 16.

Figure 9C:
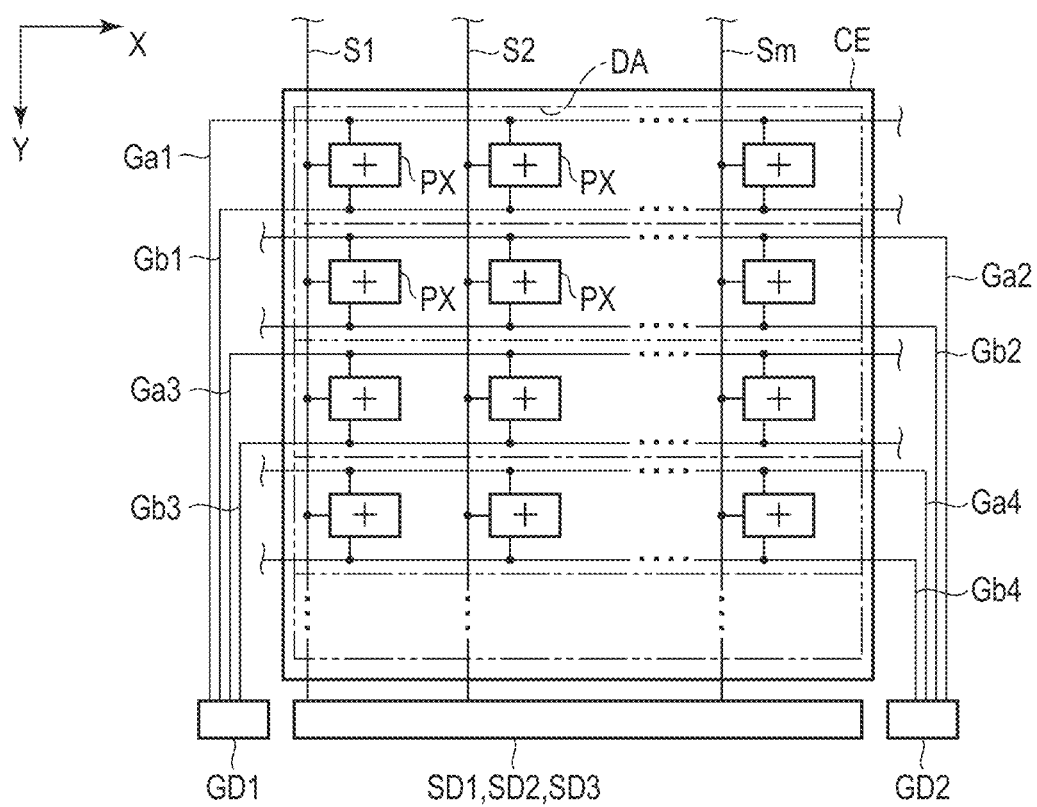
FIG. 9C is a view illustrating an outline of a subframe inversion drive scheme.

To the display device DSP, a polarity inversion drive scheme that inverts the polarity of the voltage applied to the liquid crystal layer 30 can be applied. FIGS. 9A, 9B, and 9C are diagrams illustrating an outline of the polarity inversion drive scheme. Here, a drive system in which one frame period has a plurality of subframe periods (a plurality of field periods) is applied to the display device DSP. Such a drive system is called a field sequential system, for example.

FIG. 9A illustrates a one-line inversion drive scheme in which the voltage applied to the liquid crystal layer 30 (voltage written to the pixel PX) is inverted between the positive polarity (+) and the negative polarity (−) in units of the pixels PX (one line) of one row every one subframe period.

In such a driving method, for example, the polarity of the common voltage Vcom supplied to the common electrode CE and the polarity of the image signal Vsig supplied from the signal line drive circuits SD1, SD2, and SD3 to the signal line S are inverted for every horizontal period in which the scanning line driving circuits GD1 and GD2 apply the first control signal Ca to the first scanning line Ga and apply the second control signal Cb to the second scanning line Gb. In the same horizontal period, the polarity of the common voltage and the polarity of the video signal are opposite to each other, for example. Alternatively, the drive unit DR may perform a one-line inversion drive scheme in which the voltage applied to the liquid crystal layer 30 is inverted between the positive polarity and the negative polarity for every one frame period.

Alternatively, the drive unit DR may perform driving by an interlace system for every subframe period. In this case, when the odd field period and the even field period are switched, the drive unit DR performs polarity inversion. The number of times of polarity inversion per subframe period can be significantly reduced, which can contribute to a reduction in the power consumption. In the case in which attention is paid to the pixel PX in one row, the drive unit DR can perform a one-line inversion drive scheme in which the voltage applied to the liquid crystal layer 30 is inverted between the positive polarity and the negative polarity for every subframe period or every frame period.

FIG. 9B illustrates a two-line inversion drive scheme in which the voltage applied to the liquid crystal layer 30 is inverted between the positive polarity (+) and the negative polarity (−) at every two lines. The present invention is not limited to the example of FIGS. 9A and 9B, and the polarity may be inverted at every three or more lines.

FIG. 9C illustrates a subframe inversion drive scheme in which the voltage applied to the liquid crystal layer 30 is inverted between the positive polarity (+) and the negative polarity (−) every subframe period. In such a driving method, for example, the polarity of the common voltage Vcom and the polarity of the image signal Vsi are inverted for every one subframe period. In the same subframe period, the polarity of the common voltage Vcom and the polarity of the image signal Vsig are opposite to each other, for example. Alternatively, the drive unit DR may perform a frame inversion drive scheme in which the voltage applied to the liquid crystal layer 30 is inverted between the positive polarity and the negative polarity for every frame period.

Figure 10:
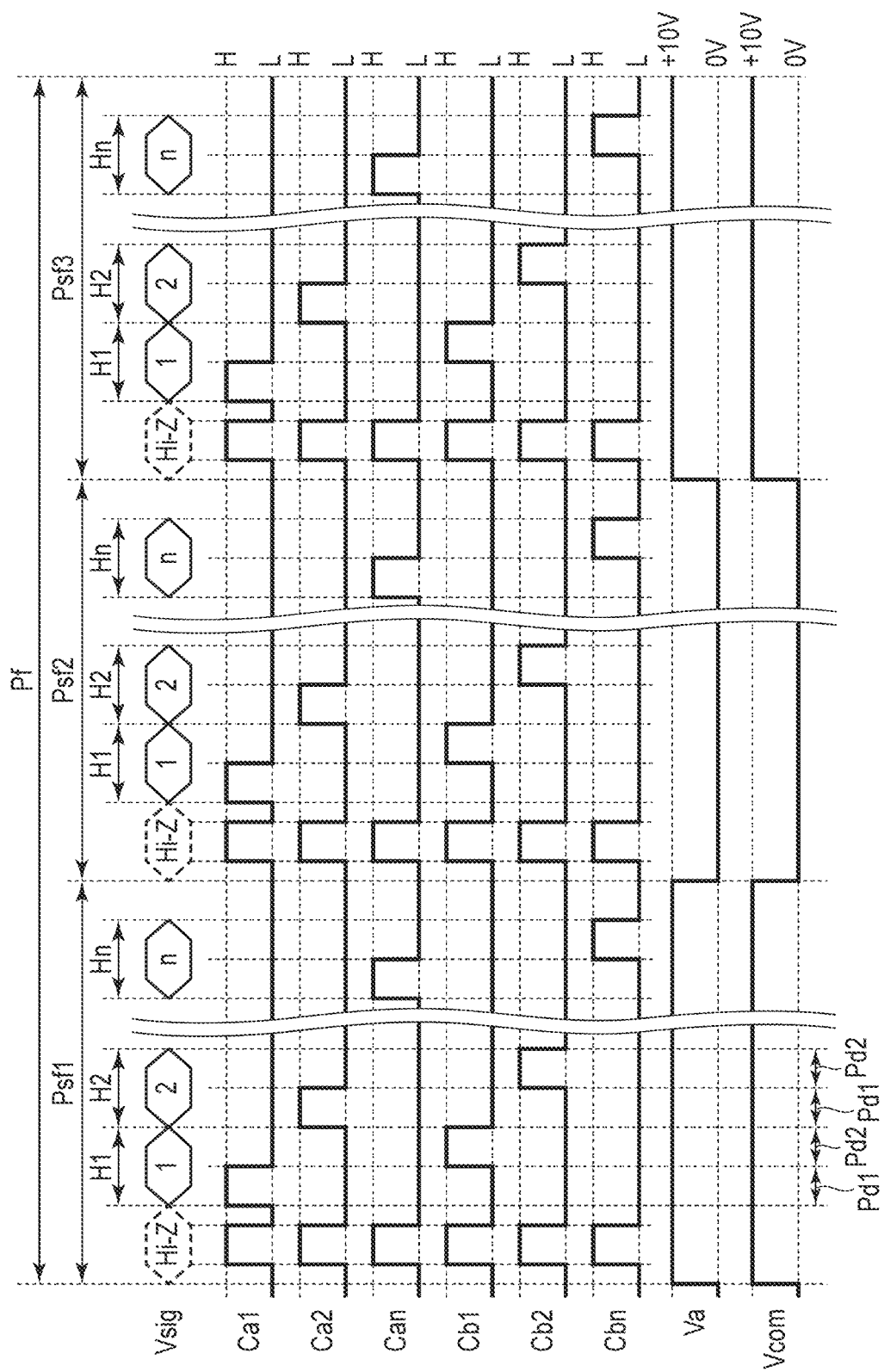
FIG. 10 is a timing chart that describes a driving method for a display device.

Next, a method of driving the display device DSP will be described. FIG. 10 is a timing chart illustrating changes in the image signal Vsig, the first control signal Ca, the second control signal Cb, the auxiliary voltage Va, and the common voltage Vcom in one frame period Pf.

As illustrated in FIG. 10, the one frame period Pf includes a first subframe period Psf1, a second subframe period Psf2, and a third subframe period Psf3. For example, a red image is displayed in the first subframe period Psf1, a green image is displayed in the second subframe period Psf2, and a blue image is displayed in the third subframe period Psf3. The images displayed in such a time-sharing manner are combined and visually recognized by a user as an image of multicolor display. In addition, each subframe period Psf includes a vertical blanking period (high impedance period) Hi-Z and a plurality of horizontal scanning periods H (H1 to Hn). Further, the horizontal scanning period H has a first driving period Pd1 and a second driving period Pd2.

As illustrated in FIG. 10, in the first subframe period Psf1, the drive unit DR switches the common voltage Vcom and the auxiliary voltage Va from 0 V to +10 V, and the drive unit DR outputs the image signal Vsig.

In the vertical blanking period Hi-Z, the drive unit DR shifts all the voltages of the first control signals Ca1 to Can and the second control signals Cb1 to Cbn to high (H) level. Then, the first switches SW1 and the second switches SW2 of all the pixels PX in the first to nth rows are turned on. After that, the drive unit DR shifts all the voltages of the first control signals Ca1 to Can and the second control signals Cb1 to Cbn to low (L) level, and the first switch SW1 and the second switch SW2 of the pixel PX in each row are switched to off.

Incidentally, here, although the case is described as an example in which the vertical blanking period Hi-Z is provided before the horizontal scanning periods H1 to Hn are started, the present invention is not limited to this, and the vertical blanking period Hi-Z may be provided after the horizontal scanning periods H1 to Hn are finished, i.e., at the end of the subframe period Psf.

Subsequently, in the first driving period Pd1 of the first horizontal scanning period H1, the drive unit DR shifts the voltage of the first control signal Ca1 to H level, and shifts the voltages of the other first control signals Ca2 to Can and all the second control signals Cb1 to Cbn to L level. Then, the first switches SW1 of all the pixels PX in the first row are turned on, and the other switches are turned off. After that, the drive unit DR sets the voltage of the first control signal Ca1 to L level, and the first switches SW1 of all the pixels PX in the first row are switched to off.

When the period goes to the second driving period Pd2 of the horizontal scanning period H1, the drive unit DR shifts the voltage of the second control signal Cb1 to H level and keeps the voltages of the other control signals at L level. Then, the second switches SW2 of all the pixels PX in the first row are turned on, and the other switches are turned off. After that, the drive unit DR shifts the voltage of the second control signal Cb1 to L level, and the second switches SW2 of all the pixels PX in the first row are switched to off.

Subsequently, in the first driving period Pd1 of the second horizontal scanning period H2, the drive unit DR shifts the voltage of the first control signal Ca2 to H level, and shifts the voltages of the other control signals to L level. Then, the first switches SW1 of all the pixels PX in the second row are turned on, and the other switches are turned off. After that, the drive unit DR shifts the voltage of the first control signal Ca2 to L level, and the first switches SW1 of all the pixels PX in the second row are switched to off.

When the period goes to the second driving period Pd2 of the horizontal scanning period H2, the drive unit DR shifts the voltage of the second control signal Cb2 to H level and keeps the voltages of the other control signals at L level. As a result, the second switches SW2 of all the pixels PX in the second row are turned on, and the other switches are turned off. After that, the drive unit DR shifts the voltage of the second control signal Cb2 to L level, and the second switches SW2 of all the pixels PX in the second row are switched to off.

The horizontal scanning period H described above is provided for all the first scanning lines Ga1 to Gan and the second scanning lines Gb1 to Gbn disposed over n rows.

As described above, in the first subframe period Psf1, the drive unit DR switches turning on and off of the first switch SW1 and the second switch SW2 in each row. Similarly, also in the second subframe period Psf2 and the third subframe period Psf3, the drive unit DR switches turning on and off of the first switch SW1 and the second switch SW2 in each row. Incidentally, here, a subframe inversion drive scheme is adopted. For this reason, in the second subframe period Psf2, the drive unit DR switches the common voltage Vcom and the auxiliary voltage Va from +10 V to 0 V. Subsequently, in the third subframe period Psf3, the drive unit DR switches the common voltage Vcom and the auxiliary voltage Va from 0 V to +10 V.

Next, an example will be described in which the image signal Vsig is written to the pixel electrodes PE (n, m) located in the nth row and the mth column with reference to FIG. 11.

Figure 11:
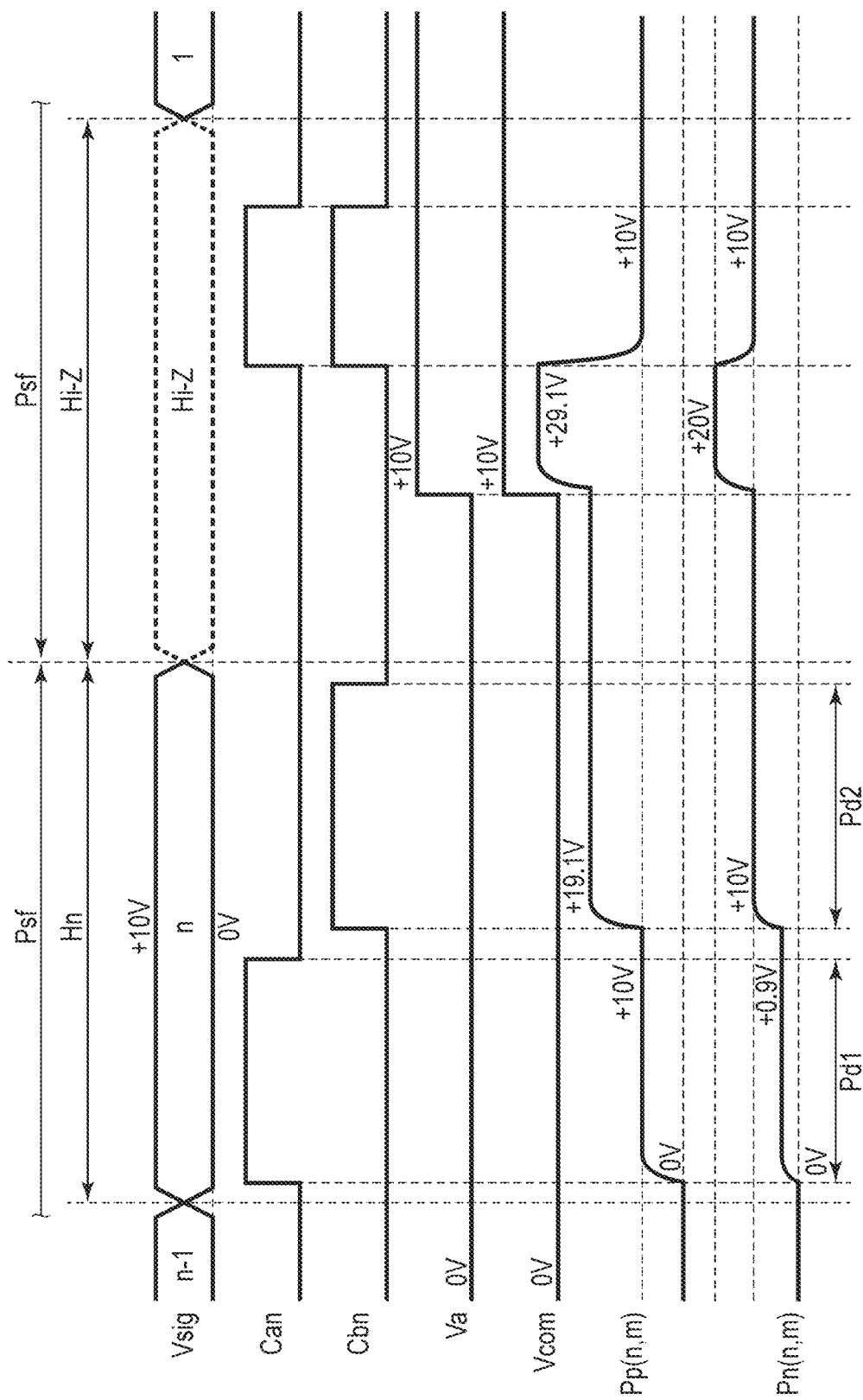
FIG. 11 is a timing chart that describes an example in which a positive image signal is written to pixel electrodes located in the nth row and the mth column.

FIG. 11 is a timing chart illustrating changes in the image signal Vsig, the first control signal Can, the second control signal Cbn, the auxiliary voltage Va, the common voltage Vcom, a potential Pp (n, m) of the pixel electrode PE (n, m), and a potential Pn (n, m) of the second transparent electrode TE2 (n, m) in the horizontal scanning period Hn provided in the predetermined subframe period Psf and the vertical blanking period Hi-Z provided in the subframe period Psf subsequent to the predetermined subframe period Psf, and FIG. 11 is a diagram that describes an example in which the image signal Vsig of a positive polarity is written to the pixel electrode PE (n, m) described above.

In the predetermined subframe period Psf including the horizontal scanning period Hn, the drive unit DR applies a voltage of 0 V as the common voltage Vcom and the auxiliary voltage Va. In the horizontal scanning period Hn, the drive unit DR outputs the image signal Vsig at a voltage of +10 V or the like.

As illustrated in FIG. 11, in the first driving period Pd1 of the horizontal scanning period Hn, the drive unit DR shifts the voltage of the first control signal Can to H level, and the drive unit DR keeps the voltage of the second control signal Cbn at L level. Then, the first switches SW1 of all the pixels PX in the nth row are switched to on, and the second switches SW2 of all the pixels PX in the nth row remain off. The drive unit DR applies the image signal Vsig to the pixel electrodes PE of all the pixels PX in the nth row through the plurality of signal lines S and the plurality of first switches SW1.

When attention is focused on the pixel PX (n, m), the image signal Vsig output by the drive unit DR is applied to the pixel electrode PE (n, m) through the signal line Sm and the first switch SW1 of the pixel PX (n, m), and the potential Pp (n, m) of the pixel electrode PE (n, m) changes (transitions) from 0 V to +10 V. In addition, when the potential Pp (n, m) of the pixel electrode PE (n, m) becomes +10 V, the potential Pn (n, m) of the second transparent electrode TE2 (n, m) changes from 0 V to +0.9 V by capacitance division based on the capacitance between the capacitor Cst and the capacitor Cmd.

After that, the drive unit DR shifts the voltage of the first control signal Can to L level. As a result, the first switch SW1 and the second switch SW2 of all the pixels PX in the nth row are turned off.

When the period goes to the second driving period Pd2 of the horizontal scanning period Hn, the drive unit DR shifts the voltage of the second control signal Cbn to H level. Then, the first switches SW1 of all the pixels PX in the nth row remain turned off, and the second switches SW2 of all the pixels PX in the nth row are switched to on. The drive unit DR applies the image signal Vsig to the second transparent electrodes TE2 of all the pixels PX through the plurality of signal lines S and the plurality of second switches SW2.

When attention is focused on the pixel PX (n, m), the image signal Vsig output by the drive unit DR is applied to the second transparent electrode TE2 (n, m) through the signal line Sm and the second switch SW2 of the pixel PX (n, m), and the potential Pn (n, m) of the second transparent electrode TE2 (n, m) changes from +0.9 V to +10 V. Then, due to the coupling action between the pixel electrode PE (n, m) and the second transparent electrode TE2 (n, m), the potential Pp (n, m) of the pixel electrode PE (n, m) changes from +10 V to +19.1 V.

After that, the drive unit DR shifts the voltage of the second control signal Cbn to L level. Then, the first switches SW1 and the second switches SW2 of all the pixels PX in the nth row are turned off. Incidentally, as in the illustrated example, there may be a margin period at the head of the horizontal scanning period Hn, between the first driving period Pd1 and the second driving period Pd2, and after the horizontal scanning period Hn.

Subsequently, in the vertical blanking period Hi-Z of the subframe period Psf subsequent to the predetermined subframe period Psf, the drive unit DR performs the inversion drive scheme that inverts the polarity of the voltage applied to the liquid crystal layer 30 while keeping turning off the first switch SW1 and the second switch SW2. In other words, in the subframe period Psf subsequent to the predetermined subframe period Psf, the drive unit DR applies a voltage of +10 V as the common voltage Vcom and the auxiliary voltage Va.

When attention is focused on the pixel PX (n, m), by performing inversion drive by the drive unit DR, the potential Pp (n, m) of the pixel electrode PE (n, m) changes from +19.1 V to +29.1 V, and the potential Pn (n, m) of the second transparent electrode TE2 (n, m) changes from +10 V to +20 V.

After that, the drive unit DR shifts the voltages of the first control signal Can and the second control signal Cbn to H level. Then, the first switches SW1 and the second switches SW2 of all the pixels PX in the nth row are switched to on. The drive unit DR applies the common voltage Vcom to the pixel electrodes PE and the second transparent electrode TE2 of all the pixels PX in the nth row through the plurality of signal lines S and the plurality of first switches SW1 and second switches SW2.

When attention is focused on the pixel PX (n, m), the common voltage Vcom output by the drive unit DR is applied to the pixel electrode PE (n, m) and the second transparent electrode TE2 (n, m) through the signal line Sm and the first switch SW1 and the second switch SW2 of the pixel PX (n, m), the potential Pp (n, m) of the pixel electrode PE (n, m) changes from +29.1 V to +10 V, and the potential Pn (n, m) of the second transparent electrode TE2 (n, m) changes from +20 V to +10 V. In other words, all the charges accumulated in the capacitor Cst and the capacitor Cmd are discharged, and the capacitances of the capacitor Cst and the capacitor Cmd are reset. According to this, since the potential difference between the pixel electrode PE and the common electrode CE becomes 0 V and the voltage applied to the liquid crystal layer 30 becomes 0 V, the liquid crystal layer 30 becomes a transparent state (i.e., the display by the liquid crystal layer 30 is black (transparent).). In the following description, the operation of applying the common voltage Vcom to the pixel electrode PE and the second transparent electrode TE2 to bring the liquid crystal layer 30 into the transparent state is referred to as "reset operation".

After that, the drive unit DR shifts the voltages of the first control signal Can and the second control signal Cbn from H level to L level. Then, the first switches SW1 and the second switches SW2 of all the pixels PX in the nth row are turned off.

As described above, in the second driving period Pd2 of the horizontal scanning period Hn, the potential Pp (n, m) of the pixel electrode PE (n, m) is +19.1 V, and the common voltage Vcom of 0 V is applied to the common electrode CE, so that a voltage of +19.1 V is applied across the pixel electrode PE and the common electrode CE. In other words, a voltage of +19.1 V is applied to the liquid crystal layer 30.

As described above, according to the driving method of the present embodiment, a voltage higher than the voltage applied to the signal line S by the drive unit DR can be applied to the pixel electrode PE, the drive unit DR can suppress the voltage applied to the signal line S, and a reduction in the power consumption of the drive unit DR can be intended.

Here, effects of the display device DSP according to the present embodiment will be described using a comparative example. Incidentally, the comparative example is for describing a part of the effects that the display device DSP according to the present embodiment can exert, and does not exclude the configuration and effect common between the comparative example and the present embodiment from the scope of the present invention.

Figure 12:
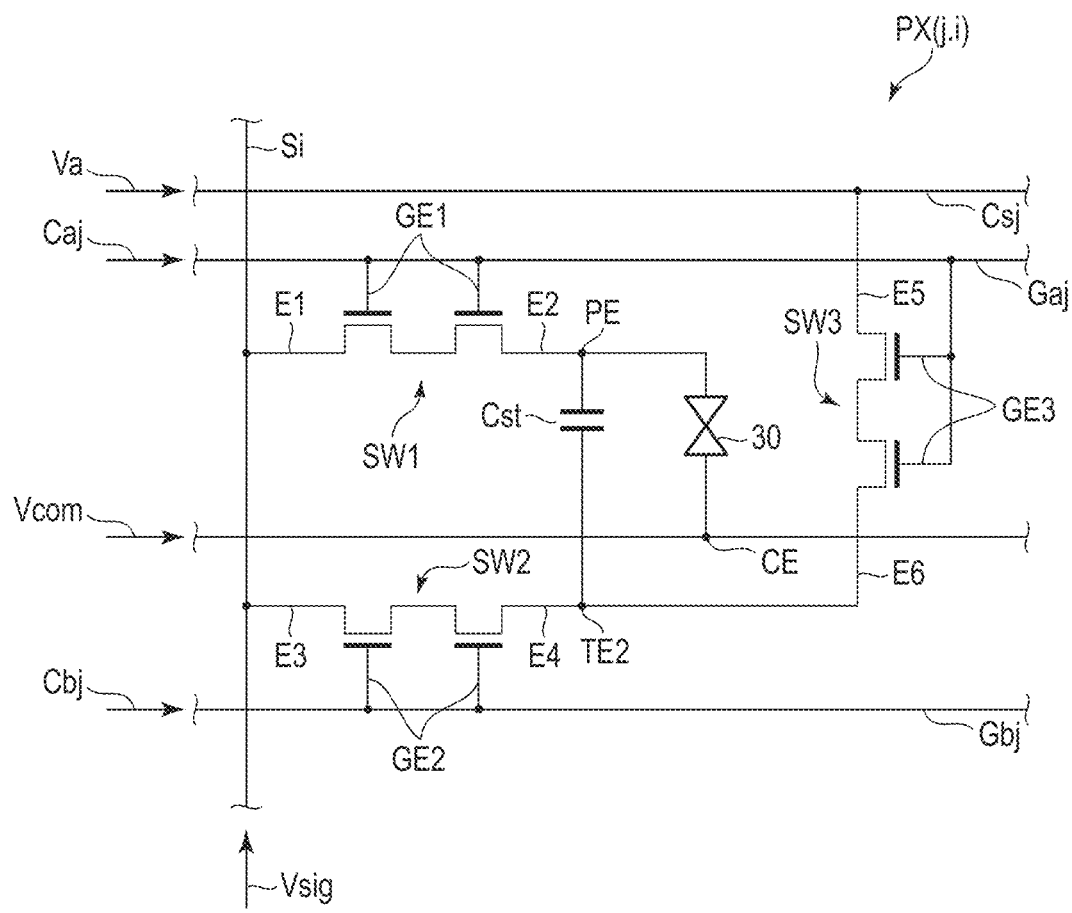
FIG. 12 is an equivalent circuit diagram illustrating a pixel according to a comparative example.

FIG. 12 is a diagram of an equivalent circuit illustrating one of a plurality of pixels PX provided in a display device 100 according to the comparative example. As illustrated in FIG. 12, the pixel PX provided in the display device 100 according to the comparative example is different from the display device DSP according to the present embodiment in that a third switch SW3 is provided instead of the first transparent electrode TE1.

The third switch SW3 includes a third gate electrode GE3, a fifth electrode E5, and a sixth electrode E6. The third gate electrode GE3 is electrically connected to a first scanning line Gaj. The fifth electrode E5 is electrically connected to a capacitive line Csj. The sixth electrode E6 is electrically connected to a second transparent electrode TE2. The turning on and off of the third switch SW3 is switched based on the first control signal Caj applied through the first scanning line Gaj. The auxiliary voltage Va is applied to the second transparent electrode TE2 in a state in which the third switch SW3 is turned on, i.e., in a state in which the TFT constituting the third switch SW3 is switched to the conductive state.

Also in such a display device 100, similarly to the display device DSP according to the present embodiment, a drive unit DR can apply a voltage higher than the voltage applied to the signal line S to the pixel electrode PE, the drive unit DR can suppress the voltage applied to the signal line S, and a reduction in the power consumption of the drive unit DR can be intended.

On the other hand, in the display device 100 according to the comparative example, since the third switches SW3 as many as the pixels PX are electrically connected to the first scanning lines Ga1 to Gan, there is a disadvantage that the number of elements electrically connected to the first scanning lines Ga1 to Gan is large and a load on the first scanning lines Ga1 to Gan is large.

On the other hand, since the display device DSP according to the present embodiment is configured to include the first transparent electrode TE1 instead of the third switch SW3, the number of elements electrically connected to the first scanning lines Ga1 to Gan can be reduced, and the load applied to the first scanning lines Ga1 to Gan can be reduced as compared with the display device 100 according to the comparative example. According to this, it is possible to realize an increase in the size (increase in the screen size) of the display panel PNL (display region DA) provided in the display device DSP, an increase in definition by narrowing the distance (pixel pitch) between two adjacent pixels PX, and the like.

In addition, since the first transparent electrode TE1 is formed of an optically transparent conductive material such as ITO, it is possible to reduce the non-transmissive region caused by the third switch SW3. In other words, the display device DSP according to the present embodiment can expand the transmission region and improve the display quality as compared with the display device 100 according to the comparative example.

Subsequently, an example will be described in which a negative image signal Vsig is written to the pixel electrode PE (n, m) according to the present embodiment with reference to FIG. 13.

Figure 13:
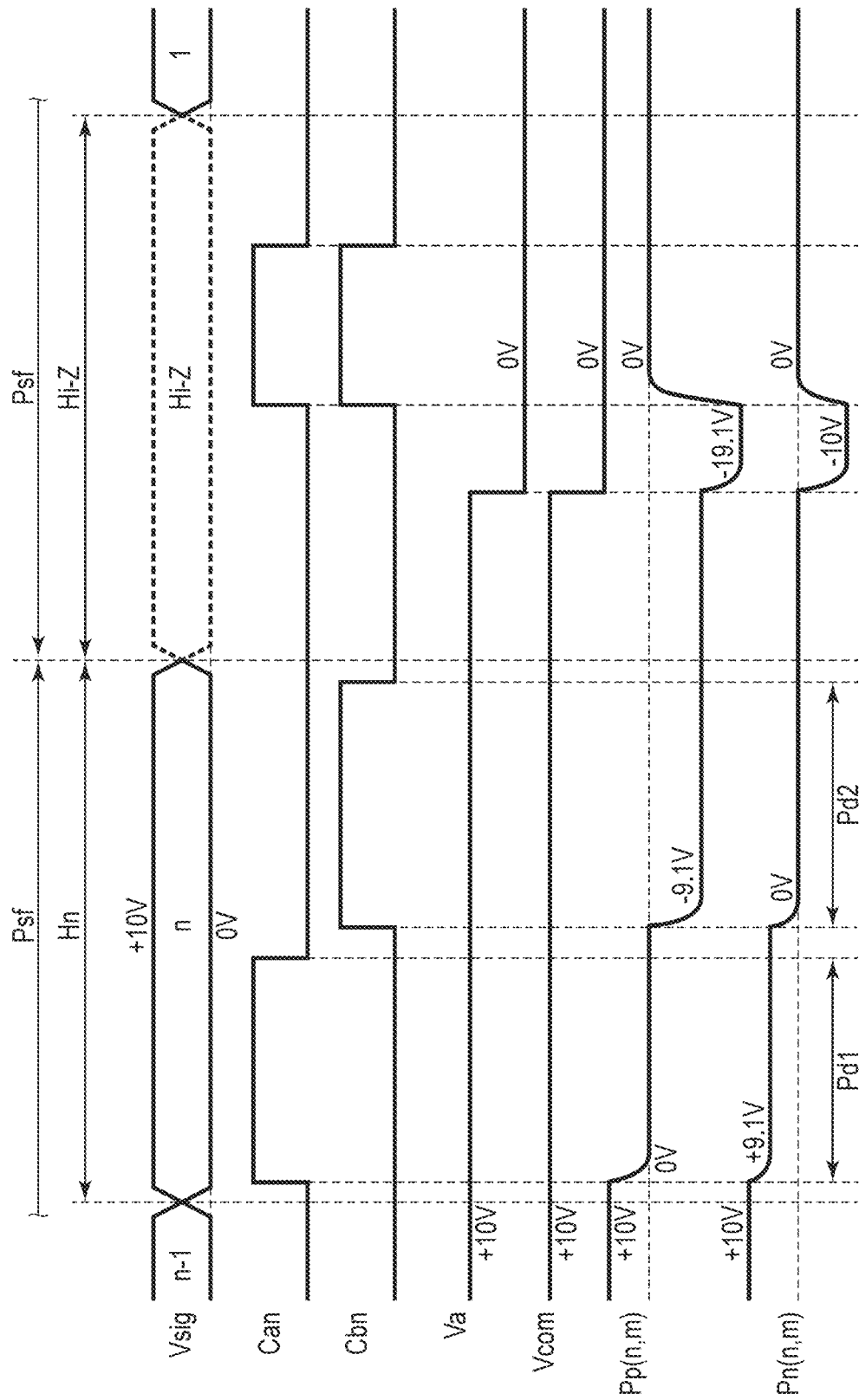
FIG. 13 is a timing chart that describes an example in which a negative image signal is written to pixel electrodes located in the nth row and the mth column.

FIG. 13 is a timing chart illustrating changes in the image signal Vsig, the first control signal Can, the second control signal Cbn, the auxiliary voltage Va, the common voltage Vcom, the potential Pp (n, m) of the pixel electrode PE (n, m), and the potential Pn (n, m) of the second transparent electrode TE2 (n, m) in the horizontal scanning period Hn provided in the predetermined subframe period Psf and the vertical blanking period Hi-Z provided in the subframe period Psf subsequent to the predetermined subframe period Psf, and FIG. 13 is a diagram that describes an example in which the image signal Vsig of a negative polarity is written to the pixel electrode PE (n, m). Incidentally, the content described in FIG. 11 is appropriately omitted.

In a predetermined subframe period Psf including the horizontal scanning period Hn, the drive unit DR applies a voltage of +10 V as the common voltage Vcom and the auxiliary voltage Va. In the horizontal scanning period Hn, the drive unit DR outputs the image signal Vsig of 0 V or the like.

As illustrated in FIG. 13, in the first driving period Pd1 of the horizontal scanning period Hn, the image signal Vsig output by the drive unit DR is applied to the pixel electrode PE (n, m), and the potential Pp (n, m) of the pixel electrode PE (n, m) changes from +10 V to 0 V. In addition, when the potential Pp (n, m) of the pixel electrode PE (n, m) becomes 0 V, the potential Pn (n, m) of the second transparent electrode TE2 changes from +10 V to +9.1 V by capacitance division based on the capacitance between the capacitor Cst and the capacitor Cmd.

Subsequently, in the second driving period Pd2 of the horizontal scanning period Hn, the image signal Vsig output by the drive unit DR is applied to the second transparent electrode TE2 (n, m), and the potential Pn (n, m) of the second transparent electrode TE2 (n, m) changes from +9.1 V to 0 V. Then, due to the coupling action between the pixel electrode PE (n, m) and the second transparent electrode TE2 (n, m), the potential Pp (n, m) of the pixel electrode PE (n, m) changes from 0 V to −9.1 V.

Subsequently, in a vertical blanking period Hi-Z of the subframe period Psf subsequent to the predetermined subframe period Psf, the drive unit DR performs the inversion drive scheme that inverts the polarity of the voltage applied to the liquid crystal layer 30. In other words, in the subframe period Psf subsequent to the predetermined subframe period Psf, the drive unit DR applies a voltage of 0 V as the common voltage Vcom and the auxiliary voltage Va. According to this, the potential Pp (n, m) of the pixel electrode PE (n, m) changes from −9.1 V to −19.1 V, and the potential Pn (n, m) of the second transparent electrode TE2 (n, m) changes from 0 V to −10 V.

After that, the reset operation is executed in the vertical blanking period Hi-Z., the common voltage Vcom output by the drive unit DR is applied to the pixel electrode PE (n, m) and the second transparent electrode TE2 (n, m), the potential Pp (n, m) of the pixel electrode PE (n, m) changes from −19.1 V to 0 V, and the potential Pn (n, m) of the second transparent electrode TE2 (n, m) changes from −10 V to 0 V.

As described above, in the second driving period Pd2 of the horizontal scanning period Hn, the potential Pp (n, m) of the pixel electrode PE (n, m) is −9.1 V, and the common voltage Vcom of 10 V is applied to the common electrode CE, so that a voltage of −19.1 V is applied across the pixel electrode PE and the common electrode CE. In other words, a voltage of −19.1 V is applied to the liquid crystal layer 30. According to this, also in the driving method illustrated in FIG. 13, the same effect as that of the driving method illustrated in FIG. 11 can be obtained.

Next, an example will be described in which the image signal Vsig of the positive polarity is written to the pixel electrode PE (n, m) according to the present embodiment and no inversion drive scheme is performed between the subframe periods Psf with reference to FIG. 14.

Figure 14:
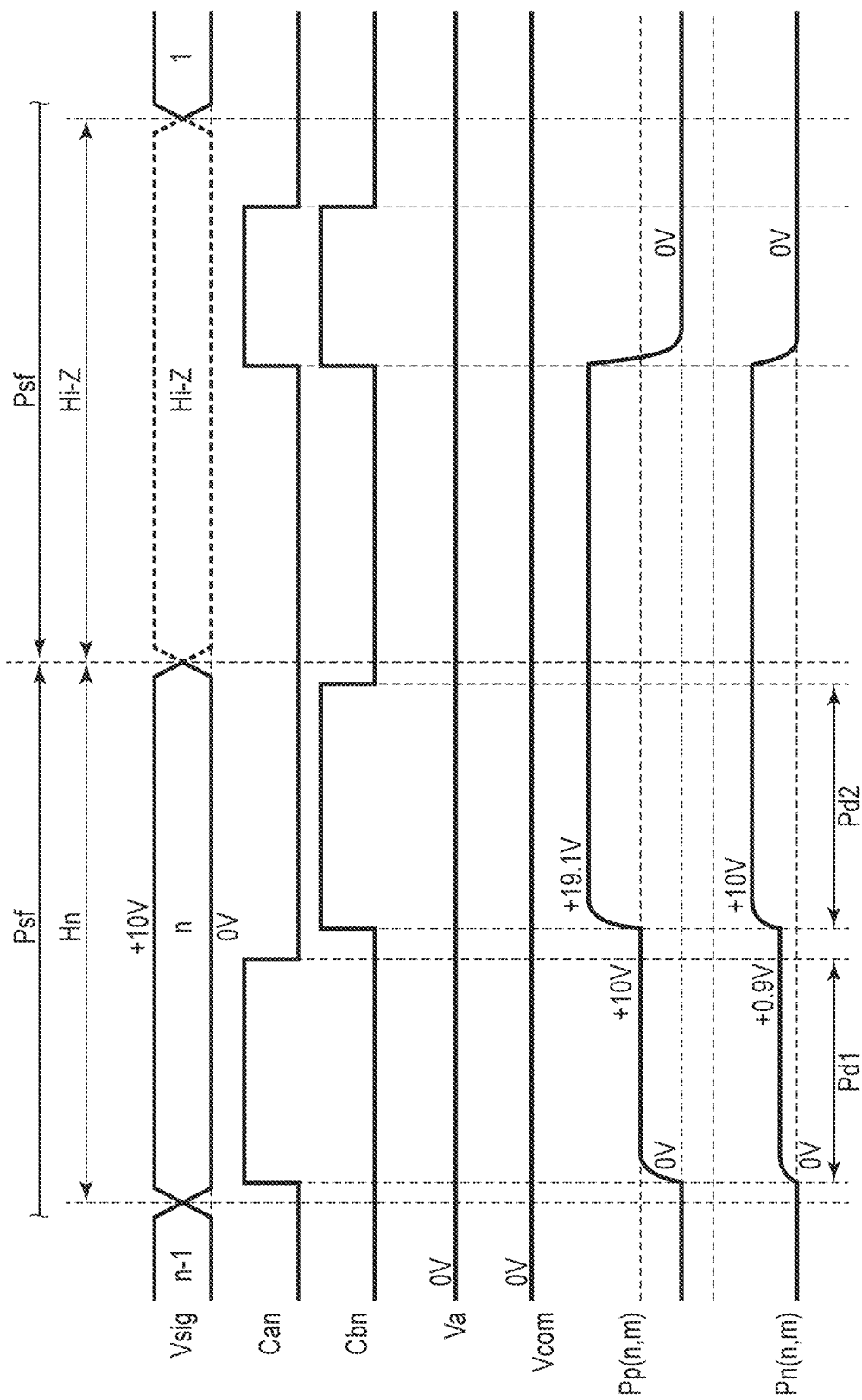
FIG. 14 is a timing chart that describes another example in which a positive image signal is written to pixel electrodes located in the nth row and the mth column.

FIG. 14 is a timing chart illustrating changes in the image signal Vsig, the first control signal Can, the second control signal Cbn, the auxiliary voltage Va, the common voltage Vcom, the potential Pp (n, m) of the pixel electrode PE (n, m), and the potential Pn (n, m) of the second transparent electrode TE2 (n, m) in the horizontal scanning period Hn provided in the predetermined subframe period Psf and the vertical blanking period Hi-Z provided in the subframe period Psf subsequent to the predetermined subframe period Psf, and FIG. 14 is a diagram that describes an example in which the image signal Vsig of a positive polarity is written to the pixel electrode PE (n, m) described above and an example in which no inversion drive scheme is performed between the subframe periods Psf. Incidentally, the content described in FIGS. 11 and 13 is appropriately omitted.

In the predetermined subframe period Psf including the horizontal scanning period Hn, the drive unit DR applies a voltage of 0 V as the common voltage Vcom and the auxiliary voltage Va. In the horizontal scanning period Hn, the drive unit DR outputs the image signal Vsig at a voltage of +10 V or the like.

As illustrated in FIG. 14, in the first driving period Pd1 of the horizontal scanning period Hn, the image signal Vsig output by the drive unit DR is applied to the pixel electrode PE (n, m), and the potential Pp (n, m) of the pixel electrode PE (n, m) changes from 0 V to +10 V. In addition, when the potential Pp (n, m) of the pixel electrode PE (n, m) becomes +10 V, the potential Pn (n, m) of the second transparent electrode TE2 changes from 0 V to +0.9 V by capacitance division based on the capacitance between the capacitor Cst and the capacitor Cmd.

Subsequently, in the second driving period Pd2 of the horizontal scanning period Hn, the image signal Vsig output by the drive unit DR is applied to the second transparent electrode TE2 (n, m), and the potential Pn (n, m) of the second transparent electrode TE2 (n, m) changes from +0.9 V to +10 V. Then, due to the coupling action between the pixel electrode PE (n, m) and the second transparent electrode TE2 (n, m), the potential Pp (n, m) of the pixel electrode PE (n, m) changes from +10 V to +19.1 V.

Subsequently, the reset operation is executed in a vertical blanking period Hi-Z of the subframe period Psf subsequent to the predetermined subframe period Psf. Specifically, the common voltage Vcom output by the drive unit DR is applied to the pixel electrode PE (n, m) and the second transparent electrode TE2 (n, m), the potential Pp (n, m) of the pixel electrode PE (n, m) changes from +19.1 V to 0 V, and the potential Pn (n, m) of the second transparent electrode TE2 (n, m) changes from +10 V to 0 V.

As described above, in the second driving period Pd2 of the horizontal scanning period Hn, the potential Pp (n, m) of the pixel electrode PE (n, m) is +19.1 V, and the common voltage Vcom of 0 V is applied to the common electrode CE, so that a voltage of +19.1 V is applied across the pixel electrode PE and the common electrode CE. In other words, a voltage of +19.1 V is applied to the liquid crystal layer 30. According to this, also in the driving method illustrated in FIG. 14, the same effects as those of the driving methods illustrated in FIGS. 11 and 13 can be obtained.

Furthermore, an example will be described in which the image signal Vsig of a negative polarity is written to the pixel electrode PE (n, m) according to the present embodiment and no inversion drive scheme is performed between the subframe periods Psf with reference to FIG. 15.

Figure 15:
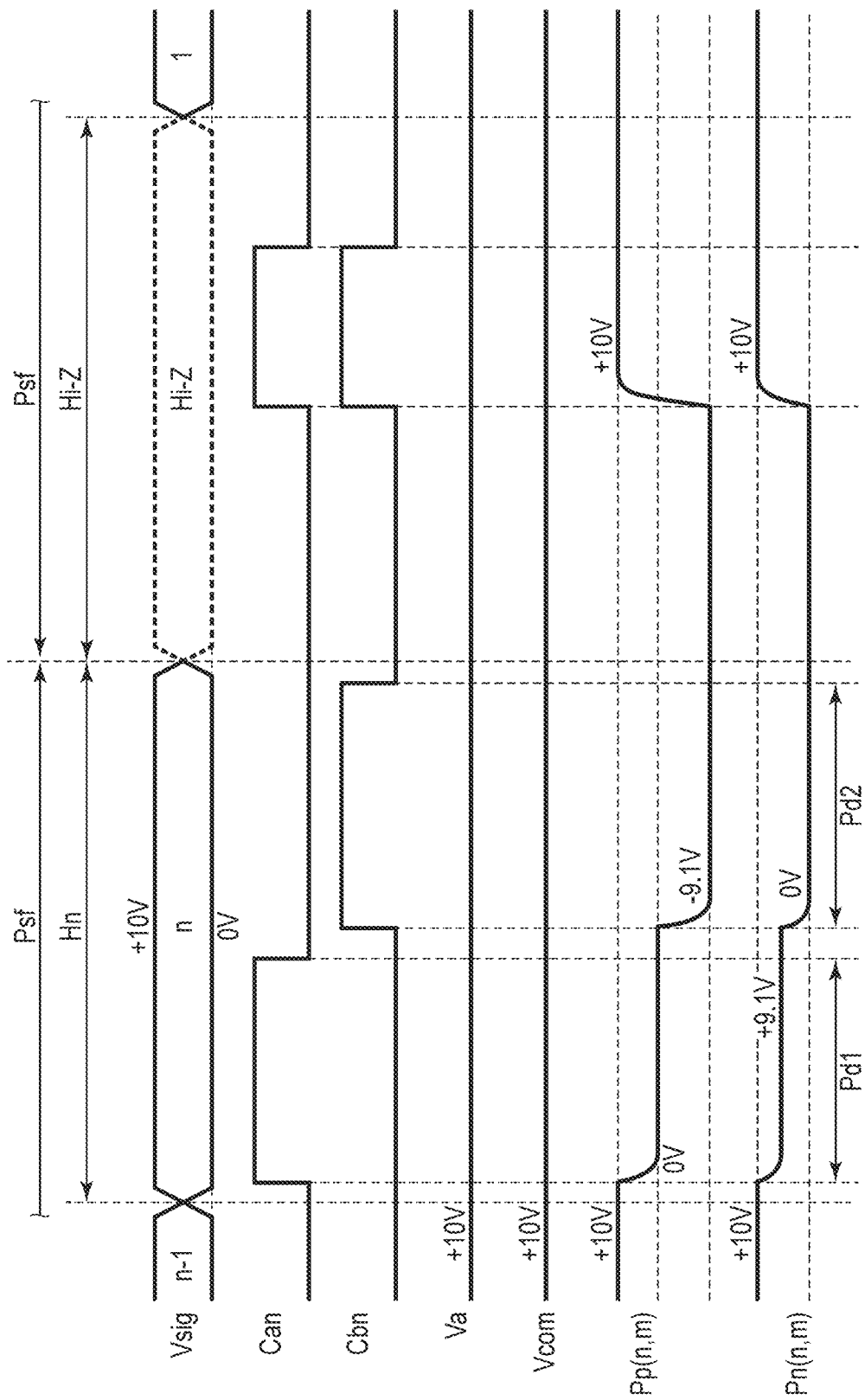
FIG. 15 is a timing chart that describes another example in which a negative image signal is written to pixel electrodes located in the nth row and the mth column.

FIG. 15 is a timing chart illustrating changes in the image signal Vsig, the first control signal Can, the second control signal Cbn, the auxiliary voltage Va, the common voltage Vcom, the potential Pp (n, m) of the pixel electrode PE (n, m), and the potential Pn (n, m) of the second transparent electrode TE2 (n, m) in the horizontal scanning period Hn provided in the predetermined subframe period Psf and the vertical blanking period Hi-Z provided in the subframe period Psf subsequent to the predetermined subframe period Psf, and FIG. 15 is a diagram that describes an example in which the image signal Vsig of a negative polarity is written to the pixel electrode PE (n, m) described above and an example in which no inversion drive scheme is performed between the subframe periods Psf. Incidentally, the content described in FIGS. 11, 13, and 14 is appropriately omitted.

In a predetermined subframe period Psf including the horizontal scanning period Hn, the drive unit DR applies a voltage of +10 V as the common voltage Vcom and the auxiliary voltage Va. In the horizontal scanning period Hn, the drive unit DR outputs the image signal Vsig of 0 V or the like.

As illustrated in FIG. 15, in the first driving period Pd1 of the horizontal scanning period Hn, the image signal Vsig output by the drive unit DR is applied to the pixel electrode PE (n, m), and the potential Pp (n, m) of the pixel electrode PE (n, m) changes from +10 V to 0 V. In addition, when the potential Pp (n, m) of the pixel electrode PE (n, m) becomes 0 V, the potential Pn (n, m) of the second transparent electrode TE2 changes from +10 V to +9.1 V by capacitance division based on the capacitance between the capacitor Cst and the capacitor Cmd.

Subsequently, in the second driving period Pd2 of the horizontal scanning period Hn, the image signal Vsig output by the drive unit DR is applied to the second transparent electrode TE2 (n, m), and the potential Pn (n, m) of the second transparent electrode TE2 (n, m) changes from +9.1 V to 0 V. Then, due to the coupling action between the pixel electrode PE (n, m) and the second transparent electrode TE2 (n, m), the potential Pp (n, m) of the pixel electrode PE (n, m) changes from 0 V to −9.1 V.

Subsequently, the reset operation is executed in a vertical blanking period Hi-Z of the subframe period Psf subsequent to the predetermined subframe period Psf. Specifically, the common voltage Vcom output by the drive unit DR is applied to the pixel electrode PE (n, m) and the second transparent electrode TE2 (n, m), the potential Pp (n, m) of the pixel electrode PE (n, m) changes from −9.1 V to +10 V, and the potential Pn (n, m) of the second transparent electrode TE2 (n, m) changes from 0 V to +10 V.

As described above, in the second driving period Pd2 of the horizontal scanning period Hn, the potential Pp (n, m) of the pixel electrode PE (n, m) is −9.1 V, and the common voltage Vcom of 10 V is applied to the common electrode CE, so that a voltage of −19.1 V is applied across the pixel electrode PE and the common electrode CE. In other words, a voltage of −19.1 V is applied to the liquid crystal layer 30. According to this, also in the driving method illustrated in FIG. 15, the same effects as those of the driving methods illustrated in FIGS. 11, 13, and 14 can be obtained.

Modified Example

Next, a modified example of the above-described embodiment will be described.

The present modified example is different from the above-described embodiment in that the above-described reset operation is not simultaneously executed for all rows and is executed in units of rows.

Figure 16:
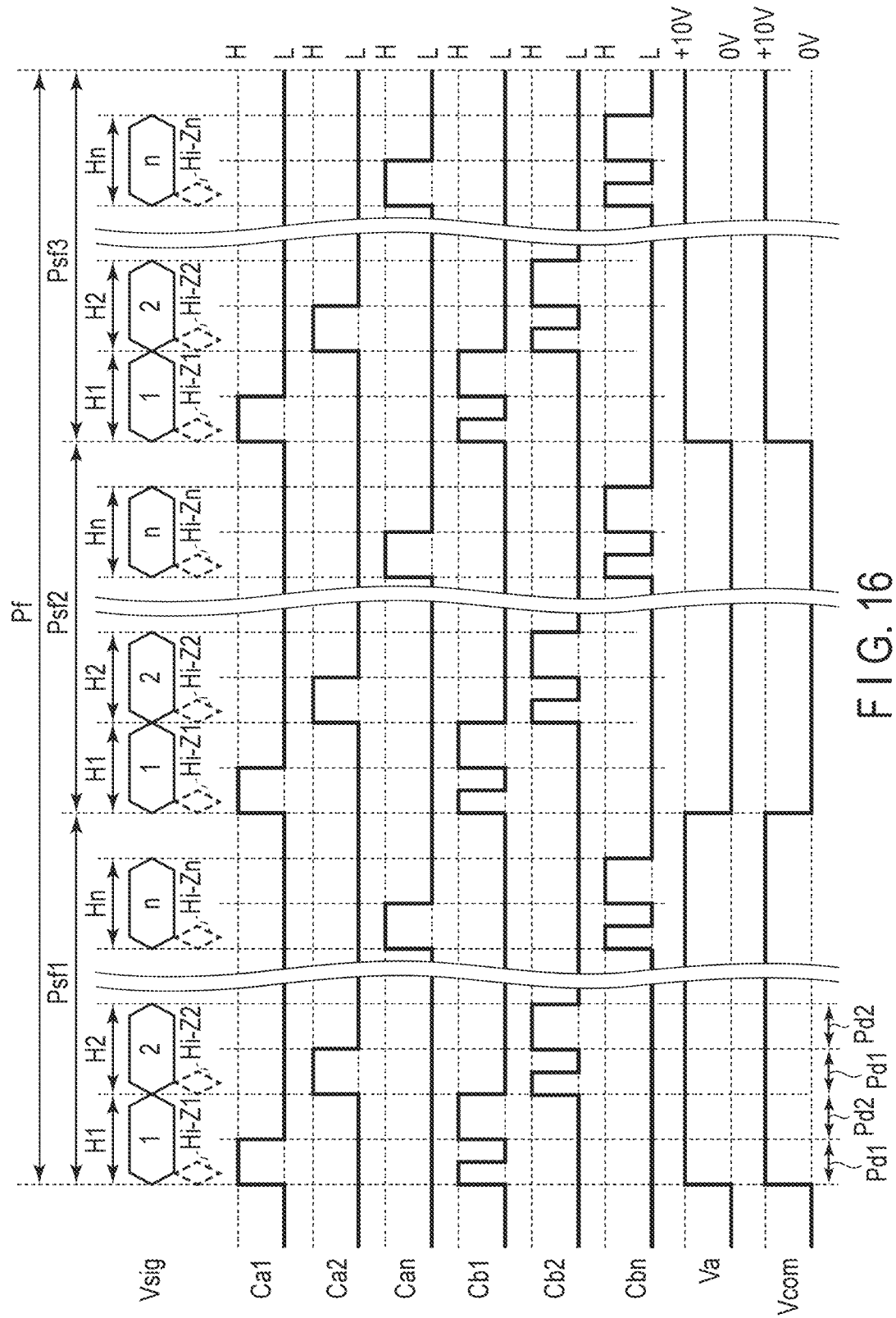
FIG. 16 is a timing chart that describes a driving method for a display device according to a modified example.

FIG. 16 is a diagram that describes a method of driving the display device DSP in the present modified example, and is a timing chart illustrating changes in the image signal Vsig, the first control signal Ca, the second control signal Cb, the auxiliary voltage Va, and the common voltage Vcom in one frame period Pf. Incidentally, the content described in FIG. 10 is appropriately omitted.

As illustrated in FIG. 16, each subframe period Psf has a plurality of horizontal scanning periods H (H1 to Hn), and each of the horizontal scanning periods H1 to Hn includes a vertical blanking period Hi-Z (Hi-Z1 to Hi-Zn). Further, the horizontal scanning period H has a first driving period Pd1 and a second driving period Pd2.

As illustrated in FIG. 16, in the first subframe period Psf1, the drive unit DR switches the common voltage Vcom and the auxiliary voltage Va from 0 V to +10 V, and the drive unit DR outputs the image signal Vsig.

First, in the first driving period Pd1 of the first horizontal scanning period H1, the drive unit DR shifts the voltage of the first control signal Ca1 to H level, and changes the voltages of the other first control signals Ca2 to Can to L level. In addition, the drive unit DR shifts the voltage of second control signal Cb1 to H level, and shifts the voltages of other second control signals Cb2 to Cbn to L level. Then, the first switch SW1 and the second switch SW2 of all the pixels PX in the first row are turned on, and the other switches are turned off.

After that, the drive unit DR shifts the voltage of the second control signal Cb1 to L level while keeping the voltage of the first control signal Ca1 at H level. Then, the second switches SW2 of all the pixels PX in the first row are turned off, and only the first switches SW1 of all the pixels PX in the first row are turned on. In the first driving period Pd1, a period in which the voltages of the first control signal Ca1 and the second control signal Cb1 are both at H level corresponds to the vertical blanking period Hi-Z1 included in the first horizontal scanning period H1.

After that, the drive unit DR sets the voltage of the first control signal Ca1 to L level, and the first switches SW1 of all the pixels PX in the first row are switched to off.

When the period goes to the second driving period Pd2 of the horizontal scanning period H1, the drive unit DR shifts the voltage of the second control signal Cb1 to H level and keeps the voltages of the other control signals at L level. Then, the second switches SW2 of all the pixels PX in the first row are turned on, and the other switches are turned off. After that, the drive unit DR shifts the voltage of the second control signal Cb1 to L level, and the second switches SW2 of all the pixels PX in the first row are switched to off.

Such a horizontal scanning period H is provided for all the first scanning lines Ga1 to Gan and the second scanning lines Gb1 to Gbn disposed over n rows. In addition, although the first subframe period Psf1 has been described above as an example, the horizontal scanning periods H1 to Hn in which the drive unit DR operates similarly are provided also in the second subframe period Psf2 and the third subframe period Psf3. However, since the subframe inversion drive scheme is adopted here, the drive unit DR switches the common voltage Vcom and the auxiliary voltage Va from +10 V to 0 V in the second subframe period Psf2, and switches the common voltage Vcom and the auxiliary voltage Va from 0 V to +10 V in the third subframe period Psf3.

Next, an example will be described in which the image signal Vsig is written to the pixel electrodes PE (n, m) located in the nth row and the mth column by a driving method according to the present modified example with reference to FIG. 17.

Figure 17:
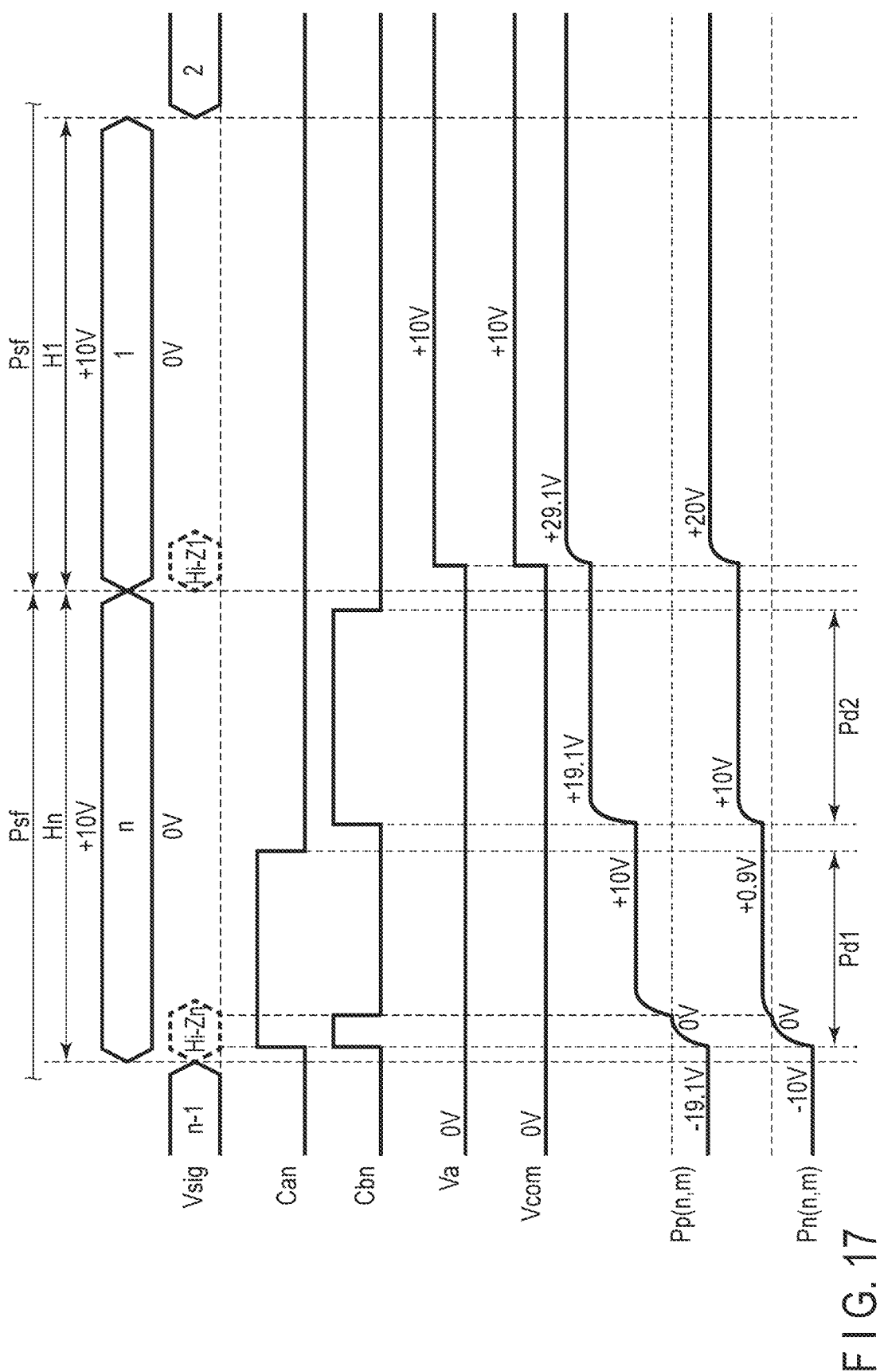
FIG. 17 is a timing chart that describes an example in which a positive image signal is written to pixel electrodes located at the nth row and the mth column by a driving method for a display device according to a modified example.

FIG. 17 is a timing chart illustrating changes in the image signal Vsig, the first control signal Can, the second control signal Cbn, the auxiliary voltage Va, the common voltage Vcom, the potential Pp (n, m) of the pixel electrode PE (n, m), and the potential Pn (n, m) of the second transparent electrode TE2 (n, m) in the horizontal scanning period Hn provided in the predetermined subframe period Psf and the horizontal scanning period H1 provided in the subframe period Psf subsequent to the predetermined subframe period Psf, and FIG. 17 is a diagram that describes an example in which the image signal Vsig of a positive polarity is written to the pixel electrode PE (n, m).

In the predetermined subframe period Psf including the horizontal scanning period Hn, the drive unit DR applies a voltage of 0 V as the common voltage Vcom and the auxiliary voltage Va. In the horizontal scanning period Hn, the drive unit DR outputs the image signal Vsig at a voltage of +10 V or the like.

As illustrated in FIG. 17, in the vertical blanking period Hi-Zn included in the first driving period Pd1 of the horizontal scanning period Hn, the drive unit DR shifts both the voltage of the first control signal Can and the voltage of the second control signal Cbn to H level. Then, the first switches SW1 and the second switches SW2 of all the pixels PX in the nth row are switched to on. The drive unit DR applies the common voltage Vcom to the pixel electrodes PE and the second transparent electrode TE2 of all the pixels PX in the nth row through the plurality of signal lines S and the plurality of first switches SW1 and second switches SW2.

When attention is focused on the pixel PX (n, m), the common voltage Vcom output by the drive unit DR is applied to the pixel electrode PE (n, m) and the second transparent electrode TE2 (n, m) through the signal line Sm and the first switch SW1 and the second switch SW2 of the pixel PX (n, m), the potential Pp (n, m) of the pixel electrode PE (n, m) changes from −19.1 V to 0 V, and the potential Pn (n, m) of the second transparent electrode TE2 (n, m) changes from −10 V to 0 V. Incidentally, the fact that the potential Pp (n, m) of the pixel electrode PE (n, m) before the change is −19.1 V and the potential Pn (n, m) of the second transparent electrode TE2 (n, m) is −10 V will be described later together with the description of FIG. 18.

After that, the drive unit DR shifts only the voltage of the second control signal Cbn from H level to L level while keeping the voltage of the first control signal Can at H level. Then, the first switches SW1 of all the pixels PX in the nth row remain on, and the second switches SW2 are turned off. The drive unit DR applies the image signal Vsig to the pixel electrodes PE of all the pixels PX in the nth row through the plurality of signal lines S and the plurality of first switches SW1.

When attention is focused on the pixel PX (n, m), the image signal Vsig output by the drive unit DR is applied to the pixel electrode PE (n, m) through the signal line Sm and the first switch SW1 of the pixel PX (n, m), and the potential Pp (n, m) of the pixel electrode PE (n, m) changes from 0 V to +10 V. In addition, when the potential Pp (n, m) of the pixel electrode PE (n, m) becomes +10 V, the potential Pn (n, m) of the second transparent electrode TE2 (n, m) changes from 0 V to +0.9 V by capacitance division based on the capacitance between the capacitor Cst and the capacitor Cmd.

After that, the drive unit DR shifts the voltage of the first control signal Can to L level. As a result, the first switch SW1 and the second switch SW2 of all the pixels PX in the nth row are turned off.

When the period goes to the second driving period Pd2 of the horizontal scanning period Hn, the drive unit DR shifts the voltage of the second control signal Cbn to H level. Then, the first switches SW1 of all the pixels PX in the nth row remain turned off, and the second switches SW2 of all the pixels PX in the nth row are switched to on. The drive unit DR applies the image signal Vsig to the second transparent electrodes TE2 of all the pixels PX through the plurality of signal lines S and the plurality of second switches SW2.

When attention is focused on the pixel PX (n, m), the image signal Vsig output by the drive unit DR is applied to the second transparent electrode TE2 (n, m) through the signal line Sm and the second switch SW2 of the pixel PX (n, m), and the potential Pn (n, m) of the second transparent electrode TE2 (n, m) changes from +0.9 V to +10 V. Then, due to the coupling action between the pixel electrode PE (n, m) and the second transparent electrode TE2 (n, m), the potential Pp (n, m) of the pixel electrode PE (n, m) changes from +10 V to +19.1 V.

After that, the drive unit DR shifts the voltage of the second control signal Cbn to L level. Then, the first switches SW1 and the second switches SW2 of all the pixels PX in the nth row are turned off.

Subsequently, in a vertical blanking period Hi-Z1 included in the first driving period Pd1 of the horizontal scanning period H1 of the subframe period Psf subsequent to the predetermined subframe period Psf, the drive unit DR performs the inversion drive scheme that inverts the polarity of the voltage applied to the liquid crystal layer 30 while keeping turning off the first switch SW1 and the second switch SW2. In other words, in the subframe period Psf subsequent to the predetermined subframe period Psf, the drive unit DR applies a voltage of +10 V as the common voltage Vcom and the auxiliary voltage Va.

When attention is focused on the pixel PX (n, m), by performing inversion drive by the drive unit DR, the potential Pp (n, m) of the pixel electrode PE (n, m) changes from +19.1 V to +29.1 V, and the potential Pn (n, m) of the second transparent electrode TE2 (n, m) changes from +10 V to +20 V.

After that, until the horizontal scanning period Hn of the subframe period Psf subsequent to the predetermined subframe period Psf, the pixel electrode PE (n, m) and the second transparent electrode TE2 (n, m) of the pixel PX (n, m) are in a floating state, and thus, the potential Pp (n, m) of the pixel electrode PE (n, m) remains at +29.1 V, and the potential Pn (n, m) of the second transparent electrode TE2 (n, m) remains at +20 V.

As described above, in the second driving period Pd2 of the horizontal scanning period Hn in the predetermined subframe period Psf, the potential Pp (n, m) of the pixel electrode PE (n, m) is +19.1 V, and the common voltage of 0 V is applied to the common electrode CE, so that a voltage of +19.1 V is applied across the pixel electrode PE and the common electrode CE. In other words, a voltage of +19.1 V is applied to the liquid crystal layer 30. According to this, also in the driving method illustrated in FIG. 17, the same effects as those of the driving method illustrated in FIGS. 11 and 13 to 15 can be obtained.

Subsequently, an example will be described in which the image signal Vsig of a negative polarity is written to the pixel electrode PE (n, m) by the driving method according to the present modified example with reference to FIG. 18.

Figure 18:
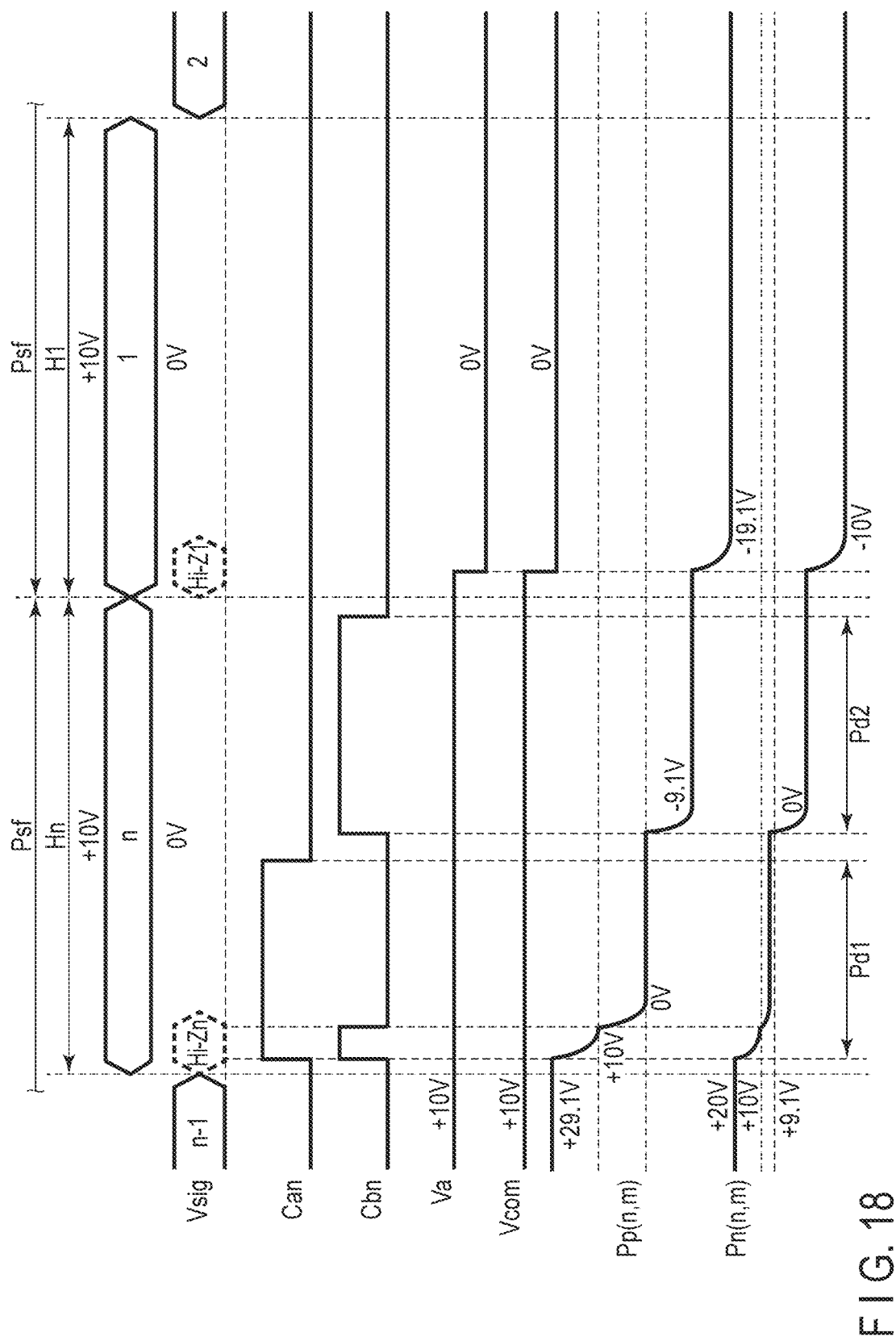
FIG. 18 is a timing chart that describes an example in which a negative image signal is written to pixel electrodes located at the nth row and the mth column by a driving method for a display device according to a modified example.

FIG. 18 is a timing chart illustrating changes in the image signal Vsig, the first control signal Can, the second control signal Cbn, the auxiliary voltage Va, the common voltage Vcom, the potential Pp (n, m) of the pixel electrode PE (n, m), and the potential Pn (n, m) of the second transparent electrode TE2 (n, m) in the horizontal scanning period Hn provided in the predetermined subframe period Psf and the horizontal scanning period H1 provided in the subframe period Psf subsequent to the predetermined subframe period Psf, and FIG. 18 is a diagram that describes an example in which the image signal Vsig of a negative polarity is written to the pixel electrode PE (n, m).

In a predetermined subframe period Psf including the horizontal scanning period Hn, the drive unit DR applies a voltage of +10 V as the common voltage Vcom and the auxiliary voltage Va. In the horizontal scanning period Hn, the drive unit DR outputs the image signal Vsig of 0 V or the like.

As illustrated in FIG. 18, in the vertical blanking period Hi-Zn included in the first driving period Pd1 of the horizontal scanning period Hn, the common voltage Vcom output by the drive unit DR is applied to the pixel electrode PE (n, m) and the second transparent electrode TE2 (n, m), the potential Pp (n, m) of the pixel electrode PE (n, m) changes from +29.1 V to +10 V, and the potential Pn (n, m) of the second transparent electrode TE2 (n, m) changes from +20 V to +10 V.

After that, when the vertical blanking period Hi-Zn included in the first driving period Pd1 of the horizontal scanning period Hn ends, the image signal Vsig output by the drive unit DR is applied to the pixel electrode PE (n, m), and the potential Pp (n, m) of the pixel electrode PE (n, m) changes from +10 V to 0 V. In addition, when the potential Pp (n, m) of the pixel electrode PE (n, m) becomes 0 V, the potential Pn (n, m) of the second transparent electrode TE2 changes from +10 V to +9.1 V by capacitance division based on the capacitance between the capacitor Cst and the capacitor Cmd.

In the second driving period Pd2 of the horizontal scanning period Hn, the image signal Vsig output by the drive unit DR is applied to the second transparent electrode TE2 (n, m), and the potential Pn (n, m) of the second transparent electrode TE2 (n, m) changes from +9.1 V to 0 V. Then, due to the coupling action between the pixel electrode PE (n, m) and the second transparent electrode TE2 (n, m), the potential Pp (n, m) of the pixel electrode PE (n, m) changes from 0 V to −9.1 V.

Subsequently, in the vertical blanking period Hi-Z1 included in the first driving period Pd1 of the horizontal scanning period H1 of the subframe period Psf subsequent to the predetermined subframe period Psf, the drive unit DR performs the inversion drive scheme that inverts the polarity of the voltage applied to the liquid crystal layer 30. In other words, in the subframe period Psf subsequent to the predetermined subframe period Psf, the drive unit DR applies a voltage of 0 V as the common voltage Vcom and the auxiliary voltage Va. According to this, the potential Pp (n, m) of the pixel electrode PE (n, m) changes from −9.1 V to −19.1 V, and the potential Pn (n, m) of the second transparent electrode TE2 (n, m) changes from 0 V to −10 V.

After that, until the horizontal scanning period Hn of the subframe period Psf subsequent to the predetermined subframe period Psf, the pixel electrode PE (n, m) and the second transparent electrode TE2 (n, m) of the pixel PX (n, m) are in a floating state, and thus, the potential Pp (n, m) of the pixel electrode PE (n, m) remains at −19.1 V, and the potential Pn (n, m) of the second transparent electrode TE2 (n, m) remains at −10 V.

As described above, in the second driving period Pd2 of the horizontal scanning period Hn in the predetermined subframe period Psf, the potential Pp (n, m) of the pixel electrode PE (n, m) is −9.1 V, and the common voltage of 10 V is applied to the common electrode CE, so that a voltage of −19.1 V is applied across the pixel electrode PE and the common electrode CE. In other words, a voltage of −19.1 V is applied to the liquid crystal layer 30. According to this, also in the driving method illustrated in FIG. 18, the same effects as those of the driving method illustrated in FIGS. 11, 13 to 15, and 17 can be obtained.

Next, an example will be described in which the image signal Vsig of the positive polarity is written to the pixel electrode PE (n, m) by the driving method according to the present modified example and no inversion drive scheme is performed between the subframe periods Psf with reference to FIG. 19.

Figure 19:
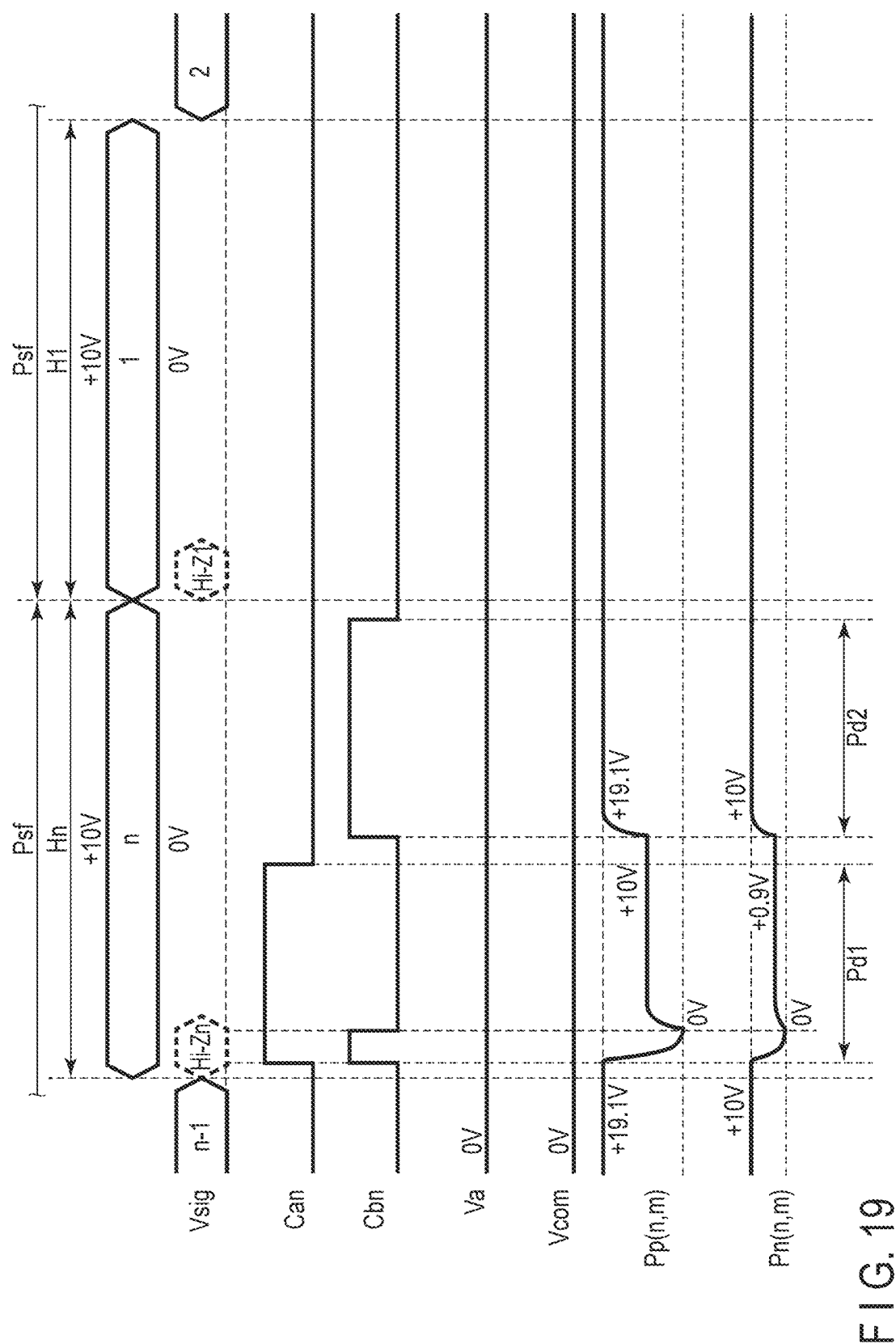
FIG. 19 is a timing chart that describes another example in which a positive image signal is written to pixel electrodes located at the nth row and the mth column by a driving method for a display device according to a modified example.

FIG. 19 is a timing chart illustrating changes in the image signal Vsig, the first control signal Can, the second control signal Cbn, the auxiliary voltage Va, the common voltage Vcom, the potential Pp (n, m) of the pixel electrode PE (n, m), and the potential Pn (n, m) of the second transparent electrode TE2 (n, m) in the horizontal scanning period Hn provided in the predetermined subframe period Psf, and FIG. 19 is a diagram that describes an example in which the image signal Vsig of the positive polarity is written to the pixel electrode PE (n, m) described above and an example in which no inversion drive scheme is performed between the subframe period Psf.

In the predetermined subframe period Psf including the horizontal scanning period Hn, the drive unit DR applies a voltage of 0 V as the common voltage Vcom and the auxiliary voltage Va. In the horizontal scanning period Hn, the drive unit DR outputs the image signal Vsig at a voltage of +10 V or the like.

As illustrated in FIG. 19, in the vertical blanking period Hi-Zn included in the first driving period Pd1 of the horizontal scanning period Hn, the common voltage Vcom output by the drive unit DR is applied to the pixel electrode PE (n, m) and the second transparent electrode TE2 (n, m), the potential Pp (n, m) of the pixel electrode PE (n, m) changes from +19.1 V to 0 V, and the potential Pn (n, m) of the second transparent electrode TE2 (n, m) changes from +10 V to 0 V.

After that, when the vertical blanking period Hi-Zn included in the first driving period Pd1 of the horizontal scanning period Hn ends, the image signal Vsig output by the drive unit DR is applied to the pixel electrode PE (n, m), and the potential Pp (n, m) of the pixel electrode PE (n, m) changes from 0 V to +10 V. In addition, when the potential Pp (n, m) of the pixel electrode PE (n, m) becomes +10 V, the potential Pn (n, m) of the second transparent electrode TE2 changes from 0 V to +0.9 V by capacitance division based on the capacitance between the capacitor Cst and the capacitor Cmd.

Subsequently, in the second driving period Pd2 of the horizontal scanning period Hn, the image signal Vsig output by the drive unit DR is applied to the second transparent electrode TE2 (n, m), and the potential Pn (n, m) of the second transparent electrode TE2 (n, m) changes from +0.9 V to +10 V. Then, due to the coupling action between the pixel electrode PE (n, m) and the second transparent electrode TE2 (n, m), the potential Pp (n, m) of the pixel electrode PE (n, m) changes from +10 V to +19.1 V.

After that, until the horizontal scanning period Hn of the subframe period Psf subsequent to the predetermined subframe period Psf, the pixel electrode PE (n, m) and the second transparent electrode TE2 (n, m) of the pixel PX (n, m) are in a floating state, and thus, the potential Pp (n, m) of the pixel electrode PE (n, m) remains at +19.1 V, and the potential Pn (n, m) of the second transparent electrode TE2 (n, m) remains at +10 V.

As described above, in the second driving period Pd2 of the horizontal scanning period Hn in the predetermined subframe period Psf, the potential Pp (n, m) of the pixel electrode PE (n, m) is +19.1 V, and the common voltage of 0 V is applied to the common electrode CE, so that a voltage of +19.1 V is applied across the pixel electrode PE and the common electrode CE. In other words, a voltage of +19.1 V is applied to the liquid crystal layer 30. According to this, also in the driving method illustrated in FIG. 19, the same effects as those of the driving method illustrated in FIGS. 11, 13 to 15, 17, and 18 can be obtained.

Furthermore, an example will be described in which the image signal Vsig of a negative polarity is written to the pixel electrode PE (n, m) by the driving method according to the present modified example and no inversion drive scheme is performed between the subframe periods Psf with reference to FIG. 20.

Figure 20:
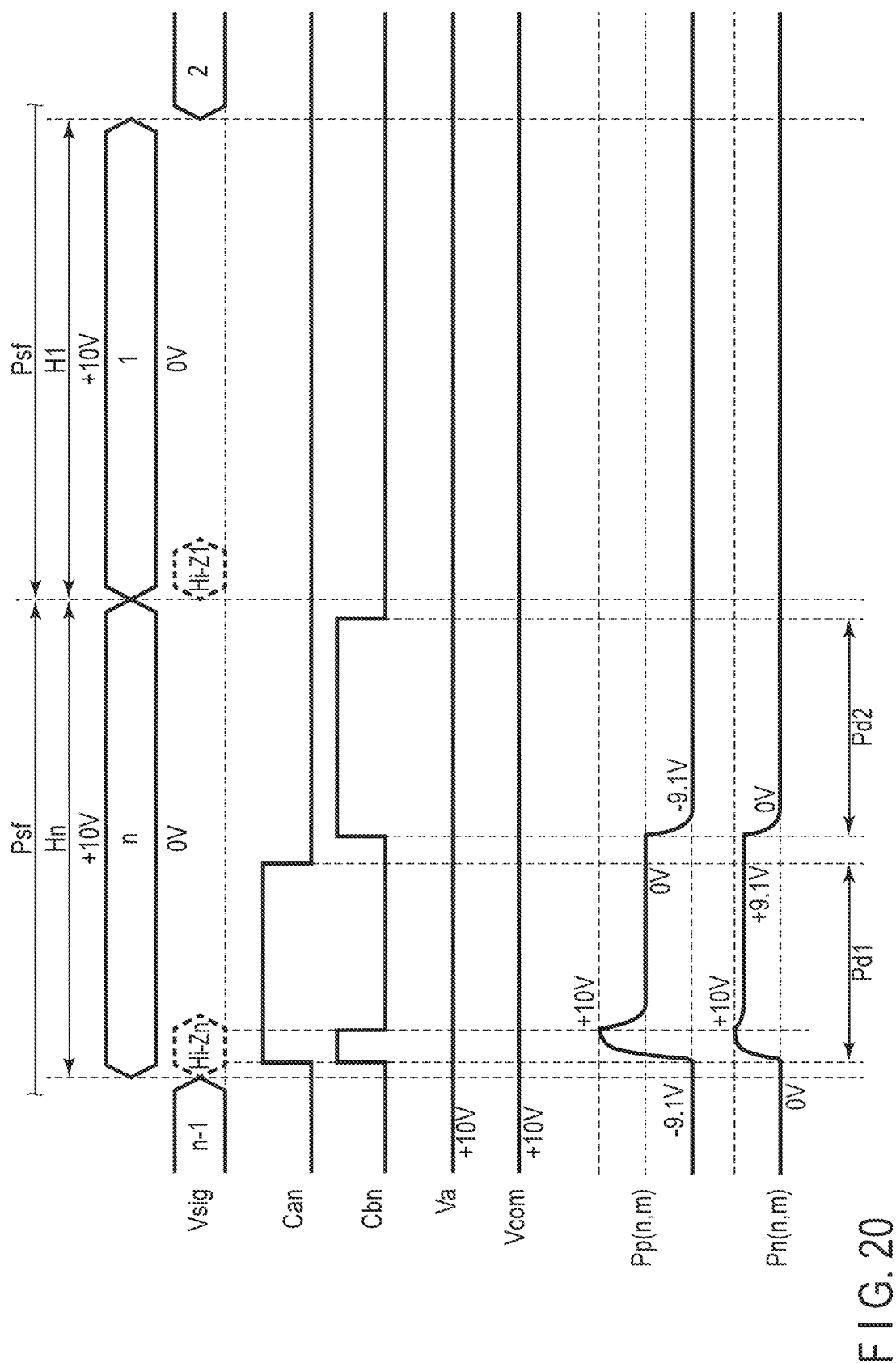
FIG. 20 is a timing chart that describes another example in which a negative image signal is written to the pixel electrode located at the nth row and the mth column by the driving method of the display device according to a modified example.

FIG. 20 is a timing chart illustrating changes in the image signal Vsig, the first control signal Can, the second control signal Cbn, the auxiliary voltage Va, the common voltage Vcom, the potential Pp (n, m) of the pixel electrode PE (n, m), and the potential Pn (n, m) of the second transparent electrode TE2 (n, m) in the horizontal scanning period Hn provided in the predetermined subframe period Psf, and FIG. 20 is a diagram that describes an example in which the image signal Vsig of a negative polarity is written to the pixel electrode PE (n, m) described above and an example in which no inversion drive scheme is performed between the subframe period Psf.

In a predetermined subframe period Psf including the horizontal scanning period Hn, the drive unit DR applies a voltage of +10 V as the common voltage Vcom and the auxiliary voltage Va. In the horizontal scanning period Hn, the drive unit DR outputs the image signal Vsig of 0 V or the like.

As illustrated in FIG. 20, in the vertical blanking period Hi-Zn included in the first driving period Pd1 of the horizontal scanning period Hn, the common voltage Vcom output by the drive unit DR is applied to the pixel electrode PE (n, m) and the second transparent electrode TE2 (n, m), the potential Pp (n, m) of the pixel electrode PE (n, m) changes from −9.1 V to +10 V, and the potential Pn (n, m) of the second transparent electrode TE2 (n, m) changes from 0 V to +10 V.

After that, when the vertical blanking period Hi-Zn included in the first driving period Pd1 of the horizontal scanning period Hn ends, the image signal Vsig output by the drive unit DR is applied to the pixel electrode PE (n, m), and the potential Pp (n, m) of the pixel electrode PE (n, m) changes from +10 V to 0 V. In addition, when the potential Pp (n, m) of the pixel electrode PE (n, m) becomes 0 V, the potential Pn (n, m) of the second transparent electrode TE2 changes from +10 V to +9.1 V by capacitance division based on the capacitance between the capacitor Cst and the capacitor Cmd.

Subsequently, in the second driving period Pd2 of the horizontal scanning period Hn, the image signal Vsig output by the drive unit DR is applied to the second transparent electrode TE2 (n, m), and the potential Pn (n, m) of the second transparent electrode TE2 (n, m) changes from +9.1 V to 0 V. Then, due to the coupling action between the pixel electrode PE (n, m) and the second transparent electrode TE2 (n, m), the potential Pp (n, m) of the pixel electrode PE (n, m) changes from 0 V to −9.1 V.

After that, until the horizontal scanning period Hn of the subframe period Psf subsequent to the predetermined subframe period Psf, the pixel electrode PE (n, m) and the second transparent electrode TE2 (n, m) of the pixel PX (n, m) are in a floating state, and thus, the potential Pp (n, m) of the pixel electrode PE (n, m) remains at −9.1 V, and the potential Pn (n, m) of the second transparent electrode TE2 (n, m) remains at 0 V.

As described above, in the second driving period Pd2 of the horizontal scanning period Hn in the predetermined subframe period Psf, the potential Pp (n, m) of the pixel electrode PE (n, m) is −9.1 V, and the common voltage of 10 V is applied to the common electrode CE, so that a voltage of −19.1 V is applied across the pixel electrode PE and the common electrode CE. In other words, a voltage of −19.1 V is applied to the liquid crystal layer 30. According to this, also in the driving method illustrated in FIG. 20, the same effects as those of the driving method illustrated in FIGS. 11, 13 to 15, and 17 to 19 can be obtained.

According to an embodiment described above, it is possible to provide a display device and a driving method for a display device capable of achieving a reduction in the power consumption.

Based on the display device described above as an embodiment of the present invention, all display devices that may be designed and modified by those skilled in the art as appropriate and implemented also belong to the scope of the present invention as long as they include the gist of the present invention.

A skilled person would conceive various changes and modifications of the present invention within the scope of the technical concept of the invention, and naturally, such changes and modifications are encompassed by the scope of the present invention. For example, if a skilled person adds/deletes/alters a structural element or design to/from/in the above-described embodiments, or adds/deletes/alters a step or a condition to/from/in the above-described embodiment, as long as they fall within the scope and spirit of the present invention, such addition, deletion and alternation are encompassed by the scope of the present invention.

Furthermore, regarding the present embodiments, any advantage and effect those will be obvious from the description of the specification or arbitrarily conceived by a skilled person are naturally considered achievable by the present invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
   a first scanning line;
   a second scanning line;
   a signal line;
   a capacitive line;
   a pixel including a pixel electrode, a first transparent electrode connected to the capacitive line, a second transparent electrode capacitively coupled to the pixel electrode, a first switch, and a second switch;
   a drive unit that applies a first control signal to the first scanning line to switch turning on and off of the first switch, applies a second control signal to the second scanning line to switch turning on and off of the second switch, applies an image signal to the signal line, and applies an auxiliary voltage to the capacitive line;
   a common electrode constituting a part of the pixel; and
   a display function layer to which a voltage applied across the pixel electrode and the common electrode is applied, wherein
   the first transparent electrode is capacitively coupled to the second transparent electrode,
   the pixel electrode overlaps the second transparent electrode,
   the second transparent electrode is located between the pixel electrode and the first transparent electrode and overlaps each of the pixel electrode and the first transparent electrode,
   the first switch is electrically connected to the signal line the pixel electrode, and the first scanning line,
   the second switch is electrically connected to the signal line, the second transparent electrode, and the second scanning line,
   in a first driving period, the drive unit turns on the first switch, turns off the second switch, and applies the image signal to the pixel electrode through the signal line and the first switch,
   in a second driving period following the first driving period, the drive unit turns off the first switch turns on the second switch, and applies the image signal to the second transparent electrode through the signal line and the second switch, and
   the drive unit turns on the first switch and the second switch during a predetermined period different from the first driving period and the second driving period, and applies a common voltage to be applied to the common electrode to the pixel electrode and the second transparent electrode through the signal line, the first switch, and the second switch.

2. The display device of claim 1, further comprising:
   a first substrate including the first scanning line, the second scanning line, the signal line, the capacitive line, the pixel electrode, the first transparent electrode, the second transparent electrode, the first switch, and the second switch; and
   a second substrate including the common electrode, wherein
   the display function layer is a liquid crystal layer using reverse mode polymer dispersed liquid crystal.

3. The display device of claim 2, wherein
   one frame period includes a plurality of consecutive subframe periods, and
   the drive unit alternately applies the image signal of positive polarity and the image signal of a negative polarity to the pixel electrode for every one subframe period, and sets a polarity of the common voltage to a polarity different from a polarity of the image signal.

4. The display device of claim 1, wherein
   a value of the auxiliary voltage is equal to a value of the common voltage.

5. A display device comprising:
   a first scanning line;
   a second scanning line;
   a signal line;
   a capacitive;
   a pixel including a pixel electrode, a first transparent electrode connected to the capacitive line, a second transparent electrode capacitively coupled to the pixel electrode, a first switch, and a second switch;
   a drive unit that applies a first control signal to the first scanning line to switch turning on and off of the first switch, applies a second control signal to the second scanning line to switch turning on and off of the second switch, applies an image signal to the signal line, and applies an auxiliary voltage to the capacitive line;
   a common electrode constituting a part of the pixel; and
   a display function layer to which a voltage applied across the pixel electrode and the common electrode is applied, wherein
   the first transparent electrode is capacitively coupled to the second transparent electrode,
   the pixel electrode overlaps the second transparent electrode,
   the second transparent electrode is located between the pixel electrode and the first transparent electrode and overlaps each of the pixel electrode and the first transparent electrode,
   the first switch is electrically connected to the signal line, the pixel electrode, and the first scanning line,
   the second switch is electrically connected to the signal line, the second transparent electrode, and the second scanning line,
   in a first driving period, the drive unit turns on the first switch, turns off the second switch, and applies the image signal to the pixel electrode through the signal line and the first switch,
   in a second driving period following the first driving period, the drive unit turns off the first switch, turns on the second switch, and applies the image signal to the second transparent electrode through the signal line and the second switch,
   the drive unit turns on the first switch and the second switch during a predetermined period included in the first driving period, and applies a common voltage to be applied to the common electrode to the pixel electrode and the second transparent electrode through the signal line, the first switch, and the second switch, and the drive unit turns off the second switch in a remaining first driving period following the predetermined period.

6. The display device of claim 5, further comprising:
a first substrate including the first scanning line, the second scanning line, the signal line, the capacitive line, the pixel electrode, the first transparent electrode, the second transparent electrode, the first switch, and the second switch; and
a second substrate including the common electrode, wherein
the display function layer is a liquid crystal layer using reverse mode polymer dispersed liquid crystal.

7. The display device of claim 6, wherein
one frame period includes a plurality of consecutive subframe periods, and
the drive unit alternately provides the image signal of positive polarity and the image signal of a negative polarity to the pixel electrode every one subframe period, and sets a polarity of the common voltage to a polarity different from a polarity of the image signal.

8. A driving method for a display device including a first scanning; line, a second scanning line, a signal line, a capacitive line and a pixel including a pixel electrode, a first transparent electrode connected to the capacitive line, a second transparent electrode capacitively coupled to the pixel electrode, a first switch, and a second switch, in which the first transparent electrode is capacitively coupled to the second transparent electrode, the first switch is electrically connected to the signal line, the pixel electrode, and the first scanning line, and the second switch is electrically connected to the signal line, the second transparent electrode, and the second scanning line, wherein
the pixel electrode overlaps the second transparent electrode,
the second transparent electrode is located between the pixel electrode and the first transparent electrode and overlaps each of the pixel electrode and the first transparent electrode, and
the display device further includes a common electrode constituting a part of the pixel and a display function layer to which a voltage applied across the pixel electrode and the common electrode is applied,
the driving method comprising:
applying a first control signal to the first scanning line to switch turning on and off of the first switch;
applying a second control signal to the second scanning line to switch on and off of the second switch;
applying an image signal to the signal line;
applying an auxiliary voltage to the capacitive line;
turning on the first switch and turning off the second switch during a first driving period to apply the image signal to the pixel electrode through the signal line and the first switch;
turning off the first switch and turning on the second switch during a second driving period following the first driving period, and applying the image signal to the second transparent electrode through the signal line and the second switch;
turning on the first switch and the second switch during a predetermined period different from the first driving period and the second driving period; and
applying a common voltage to be applied to the common electrode to the pixel electrode and the second transparent electrode through the signal line, the first switch, and the second switch.

9. A driving method for a display device including a first scanning line, a second scanning line, a signal line, a capacitive line, and a pixel including a pixel electrode, a first transparent electrode connected to the capacitive line, a second transparent electrode capacitively coupled to the pixel electrode, a first switch, and a second switch, in which the first transparent electrode is capacitively coupled to the second transparent electrode, the first switch is electrically connected to the signal line, the pixel electrode, and the first scanning line, and the second switch is electrically connected to the signal line, the second transparent electrode, and the second scanning line, wherein
the pixel electrode overlaps the second transparent electrode,
the second transparent electrode is located between the pixel electrode and the first transparent electrode and overlaps each of the pixel electrode and the first transparent electrode, and
the display device further includes a common electrode constituting a part of the pixel and a display function layer to which a voltage applied across the pixel electrode and the common electrode is applied,
the driving method comprising:
applying a first control signal to the first scanning line to switch turning on and off of the first switch;
applying a second control signal to the second scanning line to switch on and off of the second switch;
applying an image signal to the signal line;
applying an auxiliary voltage to the capacitive line;
turning on the first switch and turning off the second switch during a first driving period to apply the image signal to the pixel electrode through the signal line and the first switch;
turning off the first switch and turning on the second switch during a second driving period following the first driving period, and applying the image signal to the second transparent electrode through the signal line and the second switch;
turning on the first switch and the second switch and applying a common voltage to be applied to the common electrode to the pixel electrode and the second transparent electrode through the signal line, the first switch, and the second switch during a predetermined period included in the first driving period; and
turning off the second switch in a remaining first driving period following the predetermined period.

* * * * *